United States Patent
Fike et al.

(10) Patent No.: US 10,518,982 B1
(45) Date of Patent: Dec. 31, 2019

(54) FEED CONVEYOR FOR COMPACT PORTABLE CONVEYOR

(71) Applicant: Stout Conveyors, LLC, Placerville, CO (US)

(72) Inventors: Jonathan David Fike, Placerville, CO (US); Nick Eric Bardall, Akron, OH (US)

(73) Assignee: Stout Conveyors, LLC, Akron, OH (US)

( * ) Notice: Subject to any disclaimer, the term of this patent is extended or adjusted under 35 U.S.C. 154(b) by 0 days.

(21) Appl. No.: 16/441,602

(22) Filed: Jun. 14, 2019

(51) Int. Cl.
| | |
|---|---|
| *B65G 21/12* | (2006.01) |
| *B65G 41/00* | (2006.01) |
| *E04G 21/02* | (2006.01) |
| *B65G 37/00* | (2006.01) |
| *B65G 47/18* | (2006.01) |
| *B65G 21/14* | (2006.01) |

(52) U.S. Cl.
CPC .......... *B65G 41/008* (2013.01); *B65G 21/12* (2013.01); *B65G 21/14* (2013.01); *B65G 37/005* (2013.01); *B65G 41/005* (2013.01); *B65G 47/18* (2013.01); *E04G 21/02* (2013.01); *B65G 2201/04* (2013.01)

(58) Field of Classification Search
CPC .............................. B65G 21/12; B65G 41/002
USPC ......... 198/311, 312, 313, 314, 315; 414/505
See application file for complete search history.

(56) References Cited

U.S. PATENT DOCUMENTS

| | | | | |
|---|---|---|---|---|
| 3,687,276 A | * | 8/1972 | Pelletier ................ | B65G 37/00 198/314 |
| 4,624,357 A | * | 11/1986 | Oury ...................... | B65G 21/14 198/313 |
| 6,283,269 B1 | * | 9/2001 | Mayer .................. | B65G 41/005 198/313 |
| 6,688,450 B2 | * | 2/2004 | Speers ................. | B65G 41/005 198/303 |
| 8,033,775 B2 | * | 10/2011 | Donelson ............. | B65G 41/008 198/312 |
| 8,371,430 B2 | * | 2/2013 | Johannsen ........... | B65G 41/002 198/313 |
| 8,408,377 B2 | * | 4/2013 | Werlinger ............. | B65G 21/14 198/312 |
| 8,505,738 B2 | * | 8/2013 | O'Keeffe .................. | B07B 1/46 209/240 |
| 8,506,232 B2 | * | 8/2013 | Gallione .................. | B60P 1/36 198/314 |

(Continued)

*Primary Examiner* — Douglas A Hess
(74) *Attorney, Agent, or Firm* — Jason H. Foster; Kremblas & Foster

(57) ABSTRACT

A compact conveyor having a primary conveyor, a feed conveyor and a hopper mounted to a mobile base. The base may be a trailer or a vehicle bed. The primary conveyor is rotatably and pivotably mounted to the base. The feed conveyor has a pivoting segment pivotably mounted to the base near the second base end and disposed at least partially beneath the hopper. An extending segment of the feed conveyor is longitudinally-movably mounted to the pivoting segment and extends toward the first primary conveyor end. An arm is mounted to the base, the extending segment and a prime mover for, upon actuation of the prime mover, displacing the extending segment longitudinally relative to the pivoting segment and simultaneously pivoting the pivoting segment relative to the base. This end of the feed conveyor moves along an arc that extends from below the primary conveyor to above the conveyor.

14 Claims, 18 Drawing Sheets

(56) References Cited

U.S. PATENT DOCUMENTS

| | | | | |
|---|---|---|---|---|
| 8,876,456 B2 * | 11/2014 | Kowalchuk | ............ | A01D 87/00 |
| | | | | 198/314 |
| 9,469,482 B2 * | 10/2016 | Lichtberger | ......... | B65G 41/005 |
| 9,499,348 B2 * | 11/2016 | Teichrob | ................ | B65G 37/00 |
| 9,643,789 B2 * | 5/2017 | Teichrob | .............. | B65G 41/001 |

* cited by examiner

FEED CONVEYOR FOR COMPACT PORTABLE CONVEYOR

BACKGROUND OF THE INVENTION

The invention relates generally to material-handling equipment, and more particularly to portable equipment that moves particulate and/or slurries using conveyors that can be angled for precise positioning.

Construction workers encounter a wide range of natural and artificial features that define the physical environment of a particular construction site. The workers must accommodate such features in order to complete the construction project, but such accommodation adds to the overall cost of construction. Urban construction sites, for example have limited space, and private property may overlap with public property. Any such circumstances may result in unexpected or undesired costs, such as rent to the municipality or private property owners for use of public or private space for delivery and/or storage of materials.

Construction projects often use fluent materials, which are materials that flow, such as gravel, concrete, soil, mulch, and other bulk material, and the delivery of the same. In a limited space, there must be a process for transferring fluent material from outside of the site into the site or from one area of the construction site to another. The construction worker must ensure that such transfer is done safely and efficiently.

In the existing art, fluent material may be moved in various ways, including in a batch process by a loader scooping the material, driving the loader to another location and dropping the load. Alternatively, a telescoping conveyor may be used to deliver the material from a pile to the location where it is needed. Often such piles are not in the location where the conveyor is or the conveyor cannot reach the location where the material is needed. Furthermore, fluent material is often delivered in one location because the delivery vehicle is able to deliver it to that location, not because that location is where the material is needed.

Prior art machines have been developed that have conveyors on vehicles and on trailers. The conveyors transport fluent material along an endless belt from an infeed location to a deposit location, and can be permanently mounted to a self-propelled bulk transport vehicle or a trailer towed by such a vehicle. Thus, a conveyor can offload bulk material carried by the vehicle itself or a different vehicle. A conveyor having a feed hopper at its distal end is mounted, at its proximal end, on a self-propelled vehicle that requires a Commercial Driver's License (CDL) to transport. Such an arrangement typically also requires substantial space in operation mode to unfold and reposition the feed hopper, which has been compacted for transport over a public roadway. The hopper may be positioned so that a separate bulk transport vehicle, such as a conventional dump truck, can access the feed hopper to offload material directly into the feed hopper.

Conventional machines of the type described above store or transport the conveyor in a compacted "transport mode" in order to comply with transportation rules and regulations, and place such a machine in an expanded "operation mode" at the work site. In order to make the transformation from one mode to the other, the feed hopper must be repositioned. For example, the hopper may be moved to a side of the apparatus, vehicle or trailer, and this step adds substantial width to the equipment's operating footprint. This limits the sites at which such machines can be utilized.

In some cases, the bulk transport vehicle must also be modified so that it can offload into the feed hopper. For example, it has been found useful in the past to add a panel to the tailgate of a conventional dump truck in order to "funnel" the aggregate material into a small feed hopper. In addition, the overall size and configuration of existing machines, in both transport and operation modes, require large available spaces for accessing the site and operating within residential or small urban properties.

Between the purchase price of conventional machines, the costs of operation, and the transport and operating space requirements, conventional machines are generally not economical options for light construction companies. These and other limiting features of the prior art make use in urban construction sites and in landscaping environments very limited and often impossible.

The need exists for a conveyor apparatus that is compact enough to be maneuverable and manageable on tight streets and in residential environments even when relatively little space is available to operate. In addition, the need exists for an apparatus with a feed hopper that enables the receipt and delivery of fluent material without the need to modify the bulk transport vehicle offloading the material.

BRIEF SUMMARY OF THE INVENTION

Disclosed herein are compact conveyors systems that are useful for the residential and light construction market, along with landscaping. Nevertheless, the compact conveyors are not limited to these markets. Embodiments of the present invention include a material transport system that is mountable to a mobile base such as a trailer or vehicle bed, wherein the material transport system comprises at least two conveyors. In one embodiment, the conveyor system includes a feed conveyor assembly, a primary conveyor assembly, and a feed hopper. Any conveyor section that is incorporated into any conveyor system discussed herein includes a mechanism for transferring and depositing particulate material such as gravel, soil, sand or larger pieces. Such mechanisms include but are not limited to a conveyor belt appropriate for the applicable industry and aggregate material to be utilized in such conveyor system.

Disclosed herein is a method of operating a compact portable conveyor. The method comprises a step of transporting a base having first and second opposing base ends on a public roadway, which may be a highway or other road. The method comprises a step of pivoting a primary conveyor, which is mounted near the first base end, about a substantially horizontal axis, and rotating the primary conveyor about a substantially vertical axis. The primary conveyor has a first primary conveyor end disposed near the first base end. The method comprises applying a force to an extending segment that is longitudinally-movably mounted to a pivoting segment. The pivoting segment pivotably mounts to the base near the second base end and is disposed at least partially beneath a hopper. The applied force pivots the pivoting segment relative to the base and simultaneously displaces the extending segment longitudinally relative to the pivoting segment.

In one embodiment, the step of applying a force further comprises rotating at least one arm that is pivotably mounted to the base and is pivotably mounted to the extending segment. In another embodiment, the method further comprises displacing vertically a hopper portion of the base relative to the first base end.

Disclosed herein is a compact portable conveyor apparatus. The apparatus comprises a base that is suitable for transport on public roadways and has first and second opposing base ends. A primary conveyor is pivotably (about a substantially horizontal axis) and rotatably (about a substantially vertical axis) mounted near the first base end. The primary conveyor has a first primary conveyor end disposed near the first base end. A feed conveyor has a pivoting segment pivotably mounted to the base near the second base end and disposed at least partially beneath a hopper. The feed conveyor also has an extending segment longitudinally-movably mounted to the pivoting segment and extending toward the first primary conveyor end. The apparatus comprises at least one arm mounted to the base, the extending segment and a prime mover. Upon actuation of the prime mover, the at least one arm displaces the extending segment longitudinally relative to the pivoting segment and simultaneously pivoting the pivoting segment relative to the base.

In one embodiment, the at least one arm is pivotably mounted to the base, the extending segment, and the prime mover. In one embodiment, a first end of the at least one arm is pivotably mounted to the extending segment, a second end of the at least one arm is pivotably mounted to the prime mover, and an intermediate section of the at least one arm is pivotably mounted to the base. In one embodiment, a portion of the base to which the hopper is mounted and to which the pivoting segment is pivotably mounted is vertically moveable relative to a remaining base portion.

Disclosed herein is a compact portable conveyor apparatus. The apparatus comprises a base suitable for transport on public roadways and having first and second opposing base ends. A primary conveyor is pivotably (about a substantially horizontal axis) and rotatably (about a substantially vertical axis) mounted near the first base end. The primary conveyor has a first primary conveyor end disposed near the first base end. A feed conveyor has a pivoting segment that is pivotably mounted to the base near the second base end and disposed at least partially beneath a hopper. The feed conveyor also has an extending segment longitudinally-movably mounted to the pivoting segment and extending toward the first primary conveyor end. The apparatus has an elongated auxiliary conveyor pivotably mounted to the first primary conveyor end.

In one embodiment, the auxiliary conveyor is selectively disposed in one of a transport position (with a longitudinal axis substantially parallel to the primary conveyor and in which the auxiliary conveyor extends no farther than the primary conveyor ends) and an operational position (in which at least a portion of the auxiliary conveyor extends beyond at least the first primary conveyor end to receive material from the primary conveyor and convey the material away from the primary conveyor). In one embodiment, a longitudinal axis of the auxiliary conveyor is substantially parallel to the primary conveyor in the transport position. In one embodiment, at least one arm is mounted to the base, the extending segment and a prime mover for (upon actuation of the prime mover) displacing the extending segment longitudinally relative to the pivoting segment and simultaneously pivoting the pivoting segment relative to the base. In one embodiment, the at least one arm is pivotably mounted to the base, the extending segment, and the prime mover. In one embodiment, a first end of the at least one arm is pivotably mounted to the extending segment, a second end of the at least one arm is pivotably mounted to the prime mover, and an intermediate section of the at least one arm is pivotably mounted to the base. In one embodiment, a portion of the base to which the hopper is mounted and to which the pivoting segment is pivotably mounted is vertically moveable relative to a remaining base portion.

Figure 1:
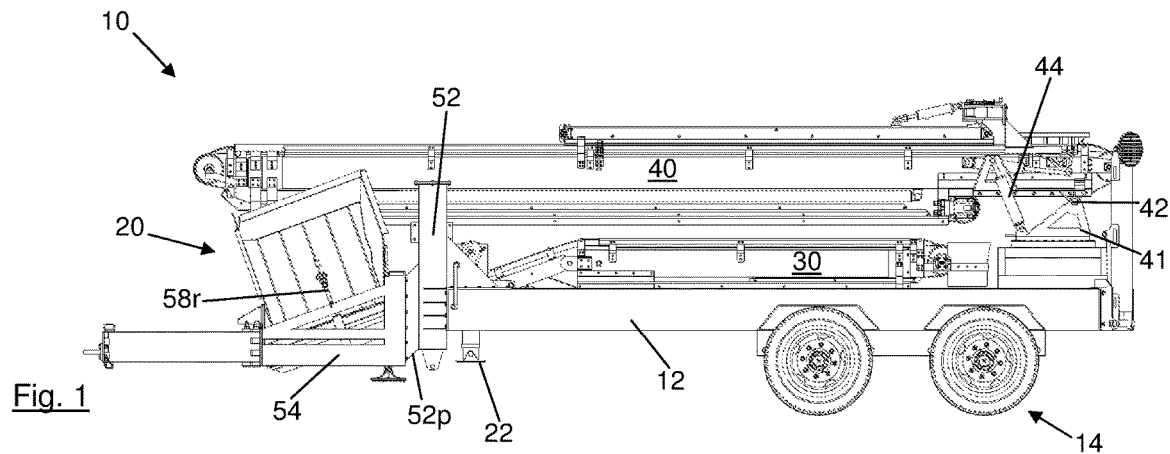
FIG. 1 is a left side view illustrating an embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

An apparatus that embodies the invention is shown in FIGS. 1-6 represented by the reference numeral 10. The apparatus 10 is shown in a transport mode, which designates a condition of the apparatus 10 when compacted into a particular configuration that is suitable for transporting along a public roadway. In this condition, the apparatus 10 desirably meets the size, weight and weight distribution requirements of cargo on a public roadway. There are various embodiments and configurations of the invention shown and described herein, and each may have different or the same configuration when in transport mode. Furthermore, the embodiments shown and described herein may be transformed from a transport mode to an operation mode. Operation mode designates a configuration of the apparatus 10 when the embodiment may be operated for its intended purpose, i.e., to convey particulate and/or fluent material from one point to another. When an embodiment is in the process of being transformed from transport mode to operation mode, or from operation mode to transport mode, that condition is designated as transition mode. As will be appreciated from the description of the invention herein, there are an infinite number of transition modes, only some of which will be described and shown, but which will be understood from the description herein by the person having ordinary skill.

The apparatus 10 shown in FIGS. 1-6 has a base, which may be a substantially planar deck 12 to which a set of conventional axles and wheels 14 are mounted. The deck 12 provides a rigid framework for various components to be mounted to as disclosed herein, and may be a conventional trailer deck which has been modified as described herein. The axles and wheels 14 permit the apparatus 10 to be transported, such as by towing behind a vehicle, along a public roadway. A conventional trailer tongue 16 is mounted or integral to the hopper frame 54, which is mounted to the front of the deck 12. In one embodiment, the tongue 16 has members 16a and 16b that hingedly mount to the hopper frame 54 at opposite lateral hopper frame 54 sides, and attach to one another at the front of the apparatus at a conventional hitch 16h, which can readily be fastened to a pickup truck, dump truck or other vehicle for towing.

Support legs, which may include pivotably mounted outriggers 26 and 28 and vertically displaceable legs 22 and 24, are mounted to the deck 12. The support legs 22-28 may have prime movers, such as hydraulic rams, a hand crank with worms and gears, or any equivalent that displace the legs 22-28 between the transport mode position shown in FIGS. 1 and 2 and a lowered, operation mode position described below. The terms "front," "back," "left," "right," "above," "below" and similar terms refer to the orientation of the apparatus 10 during towing, so that "front" means the end of the apparatus 10 that leads, and "left" is the driver's side (using the convention of driver position in the United States of America). These are used for convenience only. None of these terms is critical, and could be reversed to the opposite orientation without significant change in function as will be understood by the person of ordinary skill.

A hopper 20 is vertically-adjustably mounted at the front of the deck 12 rearward of the tongue 16 and preferably forward of the deck 12, as described in more detail herein. A feed conveyor 30 is pivotably mounted to the hopper 20 and extends rearwardly along the deck 12, generally aligned along the longitudinal axis of the apparatus 10. A primary conveyor 40 is rotatably and pivotably mounted to the upper, rear surface of the deck 12 so that it may be pivoted upwardly and downwardly about a substantially horizontal axis, as well as rotated about a substantially vertical axis between 270 and 360 degrees from one extreme to the opposite extreme, depending upon the pitch of the primary conveyor 40 and the position of other components of the apparatus 10. The hopper 20, feed conveyor 30 and primary conveyor 40 are three main components of the apparatus 10, and these components may be moved relative to one another as further described herein for the purpose of receiving and conveying material.

Figure 2:
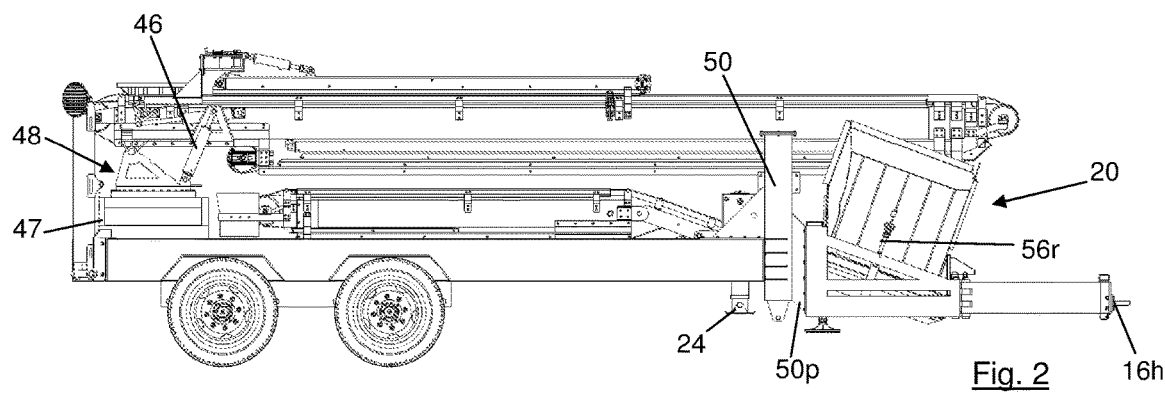
FIG. 2 is a right side view illustrating an embodiment of the present invention.
Figure 3:
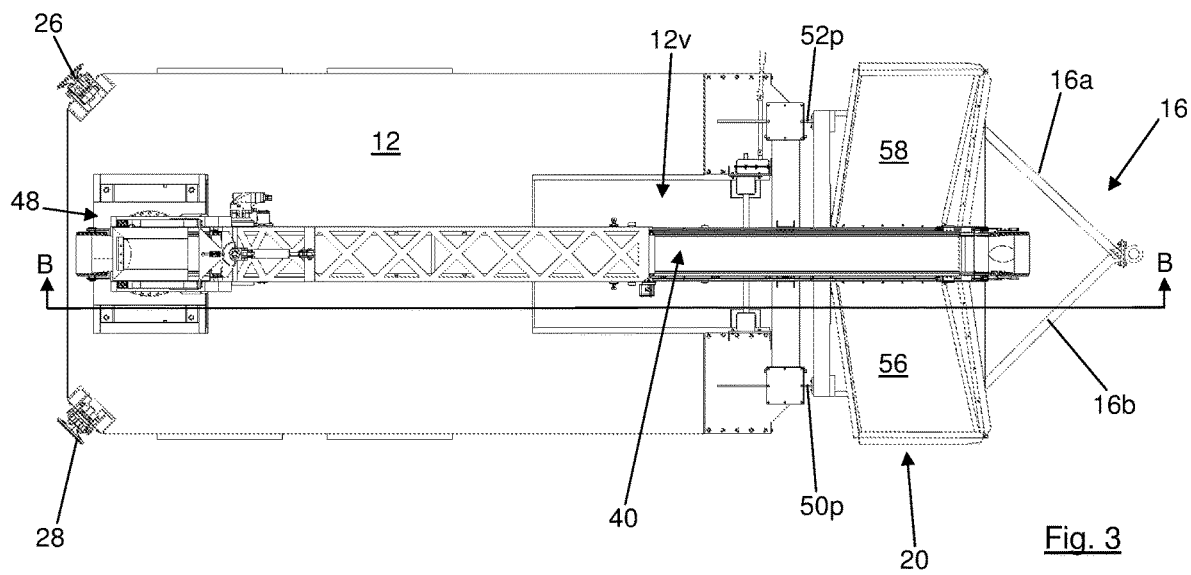
FIG. 3 is a top view illustrating an embodiment of the present invention.
Figure 4:
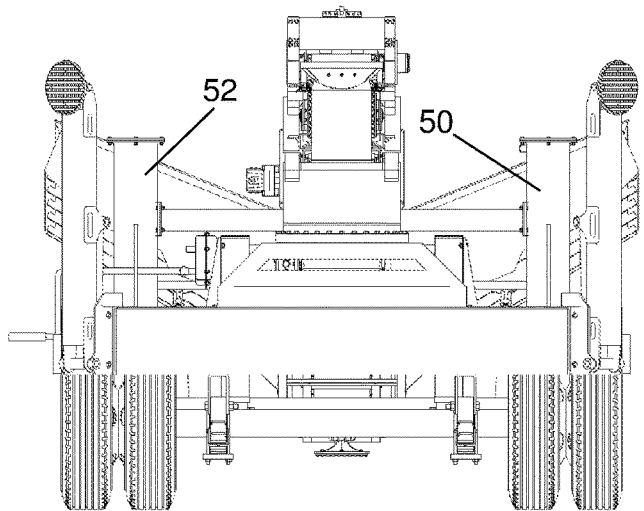
FIG. 4 is a front view illustrating an embodiment of the present invention.

The primary conveyor 40 mounts to the deck 12 via a turret mechanism, which is indicated generally at 48 in FIGS. 1-3. The turret mechanism 48 is preferably mounted along the longitudinal axis of the deck 12 near the rear of the deck 12, and the primary conveyor 40 may be positioned along this same axis when in transport mode, as shown in FIG. 3. Thus, the primary conveyor 40 is substantially aligned with the longitudinal (lengthwise) axis of the trailer when the apparatus 10 is in transport mode.

The turret mechanism 48 includes a substantially horizontal pivot axis, formed by the axle 42, between the primary conveyor and a bracket 41 that is rotatably mounted to the deck 12 about a substantially vertical axis, in some embodiments through a rigid platform 47 extending upwardly from the deck 12. The hydraulic rams 44 and 46 are pivotably mounted on opposite sides of the primary conveyor 40, and each is mounted at one respective end to the primary conveyor 40 at a position spaced from the axle 42, and at an opposite respective end to the bracket 41 at a position spaced from the axle 42. This configuration permits the primary conveyor 40 to be pivoted by actuation of the rams 44 and 46 about the substantially horizontal axis formed by the axle 42. The turret mechanism 48 is conventional, and may be substituted by any acceptable mechanism that permits the primary conveyor 40 to rotate 360 degrees or more (when there are no obstacles), while the attached conveyor and conveyor extending mechanisms operate as described herein.

In view of the foregoing, upon actuation of the rams 44 and 46, the primary conveyor 40 pivots upwardly or downwardly about the pivot axle 42 relative to the deck 12 about a substantially horizontal axis. The angle or pitch of the primary conveyor 40 may be limited to between 30 degrees above horizontal (when the apparatus 10 is on level ground) to 15 degrees below horizontal, which may be designated herein as "minus 15 degrees." Upon actuation of the turret mechanism 48, the primary conveyor rotates relative to the deck 12 about a substantially vertical axis when the deck 12 is substantially level. The primary conveyor 40 may rotate at least about 360 degrees if there are no obstacles, or it may be limited for safety or other reasons as described herein.

Figure 16:
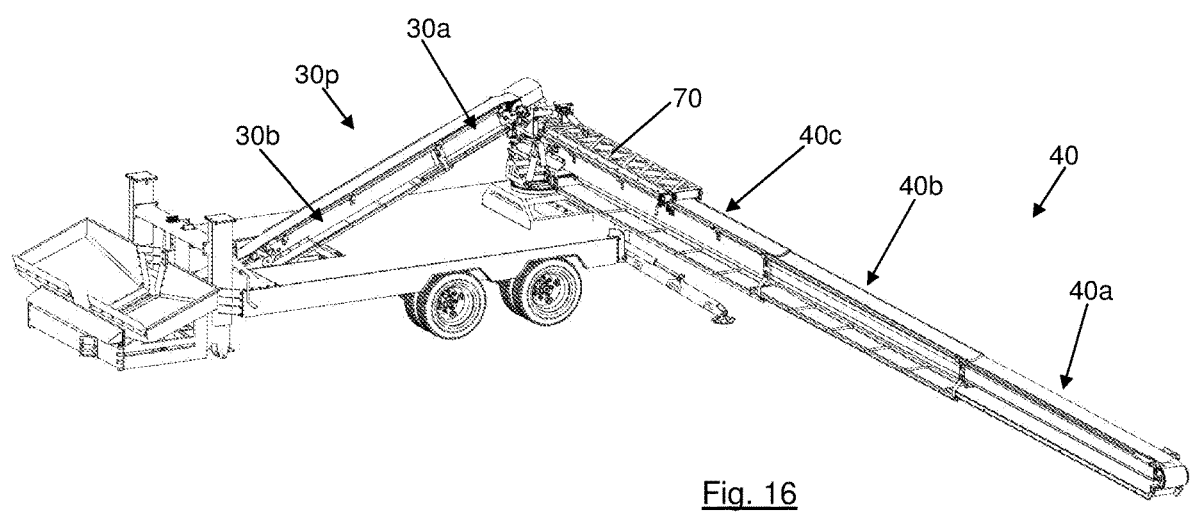
FIG. 16 is a view in perspective illustrating another embodiment of the present invention in operational mode.
Figure 17:
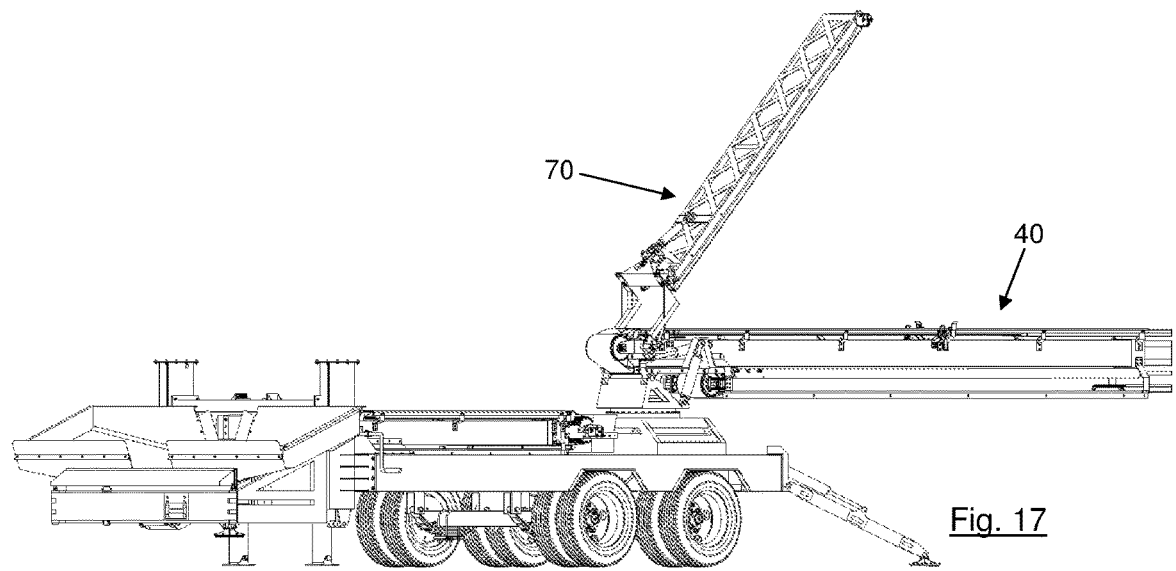
FIG. 17 is a view in perspective illustrating another embodiment of the present invention in operational mode and transitioning to another operational mode by pivoting of the auxiliary conveyor.

The primary conveyor 40 may be extended in a conventional manner to attain a greater length than that shown in FIG. 1. For example, the primary conveyor 40 may use a known mechanism to extend by folding or using a telescoping structure. An example of a suitable telescoping mechanism is shown in U.S. Pat. No. 4,156,331 (Lester), which is hereby incorporated by reference. In one embodiment of the invention, the primary conveyor 40 is a telescoping conveyor comprising a plurality of sections. For example, as shown in FIG. 16, a first section 40a may be removably contained within a second section 40b. The second section 40b may be removably contained within a third section 40c. The plurality of sections 40a, 40b and 40c may be extended outwardly from the compact conveyor apparatus 10 when in operation mode, as shown in FIG. 16. When assembled, the length of the primary conveyor 40 may be about 20 feet when in transport mode and may be a maximum of about 50 feet when fully extended. These lengths are not critical.

Figure 6:
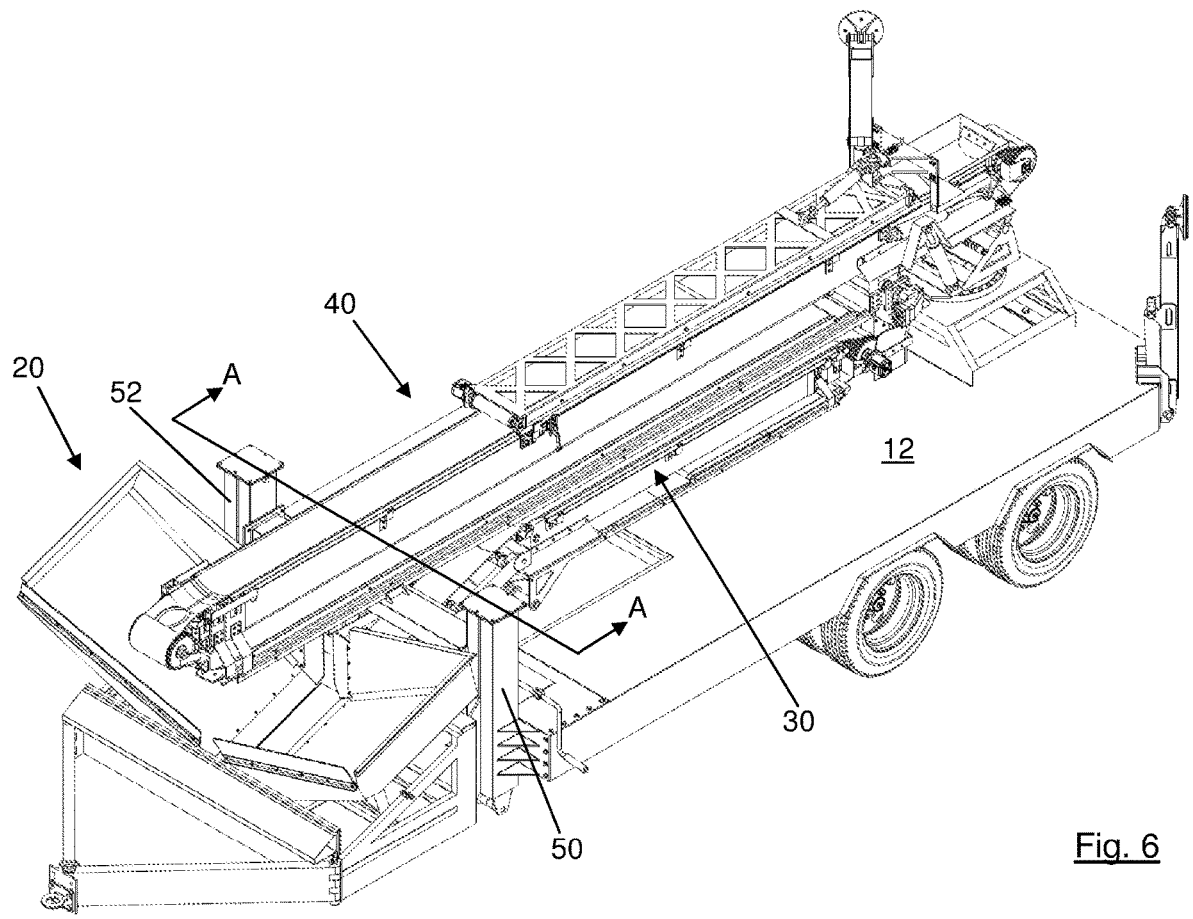
FIG. 6 is a view in perspective illustrating an embodiment of the present invention.

The feed conveyor 30, as shown in FIGS. 1, 2 and 6, preferably maintains an orientation substantially along the longitudinal axis of the deck 12 at all times. This is substantially parallel to the primary conveyor 40 when the apparatus 10 is in transport mode. While in transport mode at least a portion of the feed conveyor's 30 downwardly-facing edge may be substantially parallel to, and resting upon, the deck 12 or a support (not shown) mounted to the deck 12. In transport mode, this orientation permits at least some of the weight of the feed conveyor 30 to be supported by the deck 12 along a substantial portion of its length. When the apparatus 10 is being transported over a public roadway, this configuration may obviate additional supports or costly structures.

In one embodiment of the present invention, the feed conveyor 30 has one or more portions for transferring and depositing fluent material from the hopper 20 to the primary conveyor 40. As shown most clearly in FIGS. 7 and 8, the feed conveyor 30 may be made up of a hopper portion 30h that is in front of a pivot axle 32. The hopper portion 30h may be mounted beneath the hopper 20 to receive material from the hopper 20, and the framework of the portion 30h may not move relative to the hopper 20 at any time. The feed conveyor 30 may also have a pivoting portion 30p that is behind the pivot axle 32. The pivoting portion 30p may be pivotably mounted to the hopper portion 30h at the pivot axle 32, and may be positioned at or above the plane defined by the top surface of the deck 12. The hopper portion 30h is located at the infeed end of the feed conveyor 30, and the pivoting portion 30p pivotably attaches thereto. Upon actuation of the hydraulic ram 34 (after the primary conveyor 40 has been moved a sufficient distance from its transport mode position directly above the feed conveyor 30) the pivoting portion 30p is raised from the position shown in FIG. 7 to the position shown in FIG. 8. The pivoting portion 30p may be angled relative to horizontal and/or the deck 12 in a range of from 0 to 16 degrees, or in a range of 0 to 26 degrees, examples of which include 17.5, 22.5 and 25 degrees. The pivoting portion 30p may be positioned at any angle within the range, depending on the circumstances, and thus there are an infinite number of positions for the pivoting portion 30p.

In a preferred embodiment, the feed conveyor 30 has a telescoping mechanism. Within the pivoting portion 30p, a feed conveyor, linearly-movable section may be movably attached for extension of the feed conveyor 30. The pivoting portion 30p includes a first section 30a that is contained within a second section 30b, as shown in FIG. 16. The feed conveyor 30 may be extended in length by a mechanism that is similar to the mechanism that extends the primary conveyor 40, or by another mechanism. A conveyor belt extends in a loop from one end of the feed conveyor 30 under the hopper 20 to the opposite end of the feed conveyor 30 that extends to above the primary conveyor 40 and operates in a conventional manner to move along the length of the feed conveyor 30. A similar conveyor belt extends in a loop around the primary conveyor 40 and is moved lengthwise in a conventional manner.

In one embodiment, the hopper portion 30h is located under or within the hopper 20, which permits any fluent material contained within the hopper 20 to be directed onto the feed conveyor 30. In one embodiment the angle of the hopper portion 30h, with respect to the upwardly-facing surface of the deck 12, is between 1 and 45 degrees, and is preferably between 1 and 30 degrees. In one embodiment, the angle of the pivoting portion 30p relative to the upwardly-facing surface of the deck 12 is between 0 (when parallel to the upwardly-facing surface of the deck 12) and about 35 degrees. In a preferred embodiment, the pivoting portion 30p maintains the desired angle in relation to the deck 12 when in operation mode. Of course, the angle can be modified, but it typically is not modified during use unless the primary conveyor 40 is moved, such as by changing its pitch (angle relative to horizontal) or its rotation (angle relative to the longitudinal axis of the apparatus 10). The pivoting portion 30p receives conveyed material from the hopper portion 30h and conveys it further onto the primary conveyor 40, which conveys the material further.

In one embodiment, the hopper 20 may be vertically-movably mounted to the deck 12, possibly through other structures that are interposed between the hopper 20 and the deck 12. Thus, the hopper 20 has the ability to change its vertical position relative to the deck 12, possibly along with its horizontal position. The hopper 20 is movable at least vertically, and may be moveable a distance from one extreme to the opposite of about one foot, 1.5 feet, two feet or more. In one embodiment, the hopper 20 is mounted to a rigid frame 54 (FIG. 1). The frame 54 mounts to the deck 12 through plates extending into two vertical sleeves 50 and 52 that are rigidly mounted to the front end of the deck 12. In an embodiment in which the hitch 16 is mounted to the front of the frame 54, the hopper 20 may be interposed between the deck 12 and the hitch 16.

Figure 22:
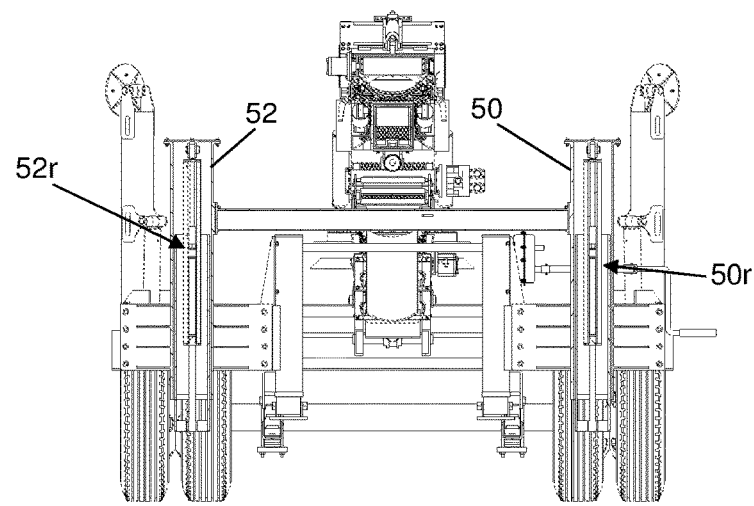
FIG. 22 is a view in section through the line A-A in FIG. 6 illustrating the prime movers 50r and 52r within the sleeves 50 and 52.

Two linear prime movers, such as the hydraulic rams 50r and 52r, may be mounted within the sleeves 50 and 52, as shown in FIG. 22, with the first ram 50r mounted within the sleeve 50 and the second ram 52r mounted within the sleeve 52. One end of each ram may be mounted to a respective cap fixed at the top of each sleeve, and the opposite end of each ram may be mounted to one end of a respective plate. The plates 50p and 52p are shown in FIGS. 1-3, and each plate extends through a corresponding slot in a respective sleeve and mounts, at the opposite plate end, to the hopper frame 54 to which the hopper 20 mounts. Thus, upon actuation of the rams 50r and 52r, the plates 50p and 52p are raised or lowered, thereby raising or lowering, respectively, the rigidly attached hopper frame 54 to which the hopper 20 is mounted, along with the attached feed conveyor 30. In this embodiment, the rams 50r and 52r thereby vertically displace the hopper 20 and the feed conveyor 30 relative to the deck 12. Raising and lowering the hopper 20 may be accomplished while maintaining a center of the hopper 20 aligned on the longitudinal axis of the deck 12. The hopper 20 may move with a vertical component, which is along a path that is in both the vertical and horizontal direction, or it may be only along a vertical path. Both of these are encompassed by the phrase "along a vertical component."

The hopper 20 has two lateral guide plates 56 and 58 (FIG. 5) that are pivotably mounted to the hopper frame 54, preferably by hinges located where the plates are closest to one another: near the longitudinal axis of the apparatus 10. A gap is formed between the two closest edges of the plates 56 and 58 to permit fluent material that is poured into the hopper 20 to flow along the plates 56 and 58, between the adjacent edges and then downwardly onto the hopper portion 30h of the feed conveyor 30. In one embodiment, the gap between the adjacent edges of the plates 56 and 58 is about 12 inches wide. In one embodiment the gap is 5 inches wide and in another embodiment the gap is 24 inches wide.

Two prime movers, which may be hydraulic rams 56r and 58r, are mounted to and between the hopper frame 54 and the guide plates 56 and 58. An upper end of each ram is pivotably mounted to a corresponding plate a predetermined distance from where the corresponding plate pivotably mounts to the frame 54. A lower end of each ram is pivotably mounted to the frame 54 a predetermined distance from where a corresponding plate pivotably mounts to the frame 54. Upon extension of the rams 56r and 58r, the guide plates 56 and 58 pivot upwardly away from the frame 54, and upon contraction of the rams, the guide plates pivot downwardly toward the frame 54.

Figure 5:
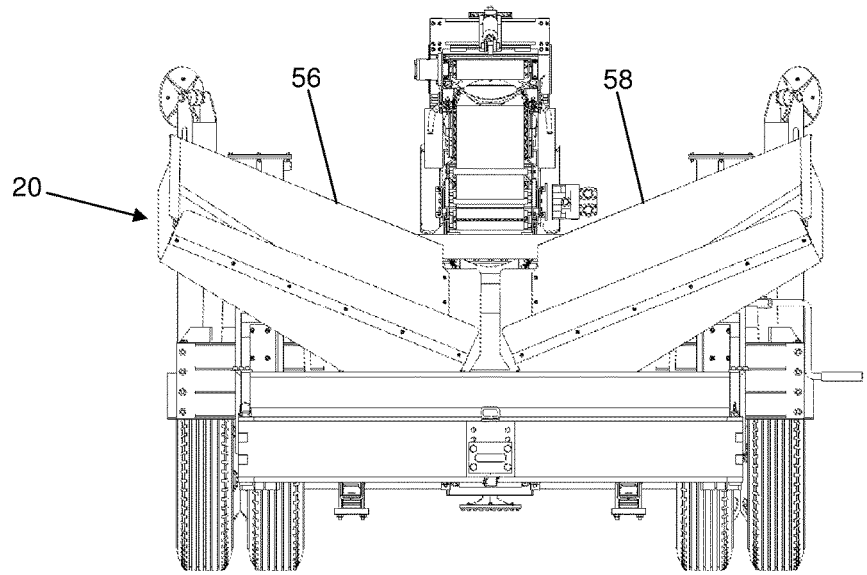
FIG. 5 is a rear view illustrating an embodiment of the present invention.
Figure 9:
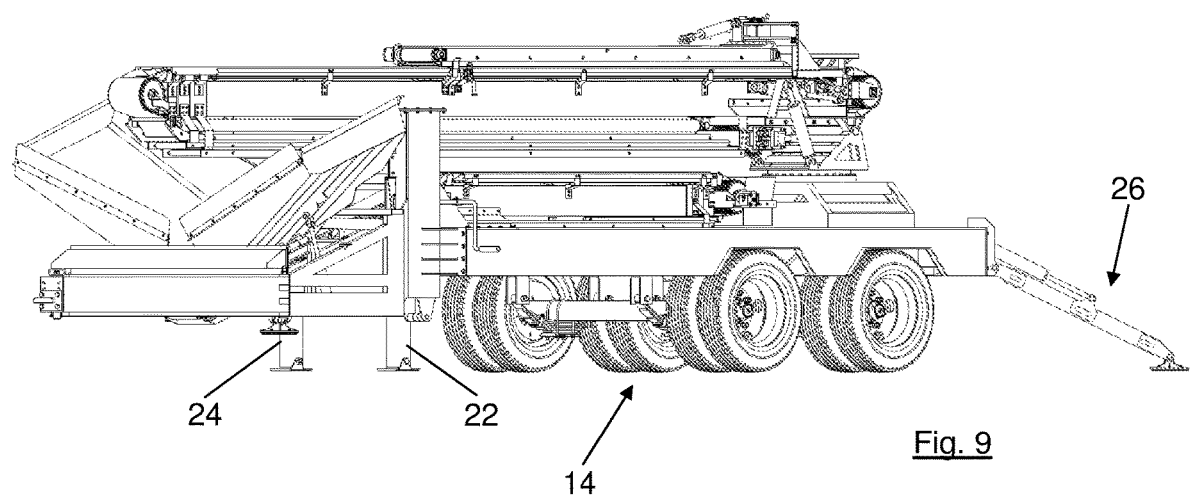
FIG. 9 is a front left view in perspective illustrating an embodiment of the present invention transitioning from a transport mode to an operational mode by extension of the outriggers and other ground supports.

When the guide plates 56 and 58 are in transport mode, shown in FIGS. 5 and 9, the guide plates 56 and 58 are in their narrowest configuration pivoted upwardly to an extreme and as close as the plates are positioned in normal use. This narrow configuration permits the apparatus 10 to fit within the width limitations for structures transported on a public roadway. During transition to the operation mode, the rams 56r and 58r actuate to pivot the guide plates 56 and 58 downwardly to the lowest position (see FIG. 10) to reach their widest configuration. This widest configuration disposes the guide plates 56 and 58 at a lateral distance, from farthest edge to farthest edge, that is similar to, or greater than, the width of a dump truck or other vehicle that pours or otherwise conveys fluent material into the hopper 20. The hopper 20 thereby guides the material toward the gap and downwardly onto the feed conveyor 30. It is apparent from FIG. 10 that, even in their widest configuration, the guide plates 56 and 58 define a floor that is angled toward the gap between the plates 56 and 58 in order to encourage fluent material to flow into the gap.

The apparatus 10 is in transport mode in FIGS. 1-7, in which the apparatus 10 may be stored or it may be transported along a public roadway, such as by being towed. When the apparatus arrives at a construction or other site, it must be transitioned to operation mode in order to be used. In FIG. 9, the preferred beginning of this transition is shown where the outriggers 26 and 28 (outrigger 28 is not visible in FIG. 9) have been extended downwardly from their transport mode position, as have the legs 22 and 24. These legs 22-28 are operated in a conventional manner to reach the ground, G (FIG. 8) upon which the wheels 14 rest and support the deck 12 on that ground directly by rigid structures rather than pneumatic tires or other structures that readily deform when a force is applied to them. The ground, G, may be made up of soil, sand, gravel, pavement, or any suitable material.

Figure 8:
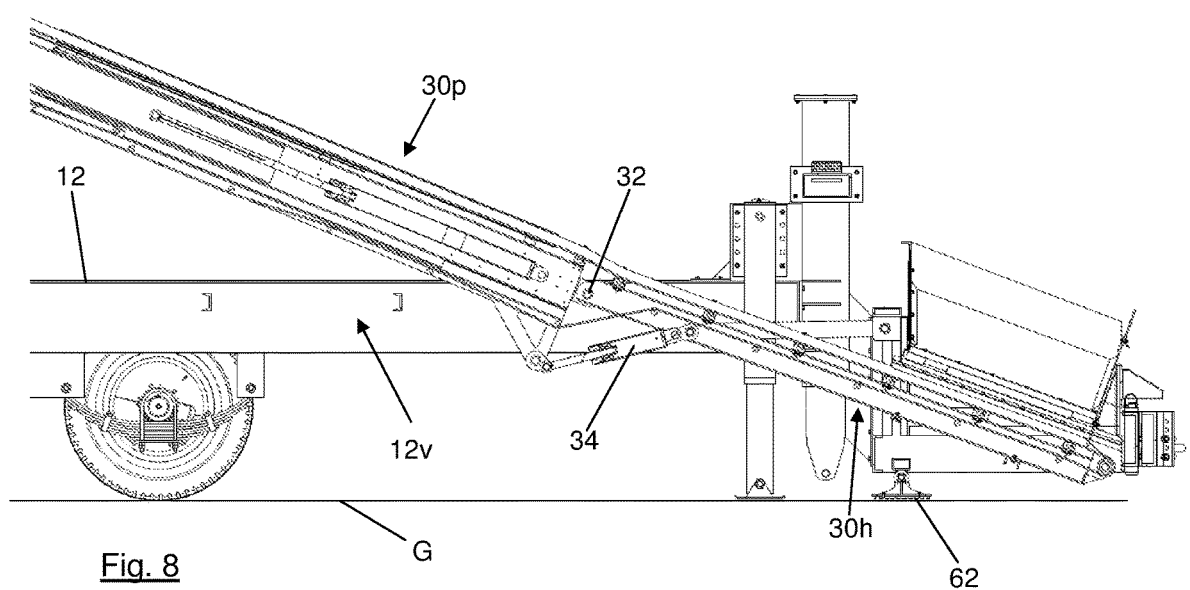
FIG. 8 is a magnified right side view in section through the line B-B of FIG. 3 illustrating an embodiment of the present invention in an operational mode.
Figure 10:
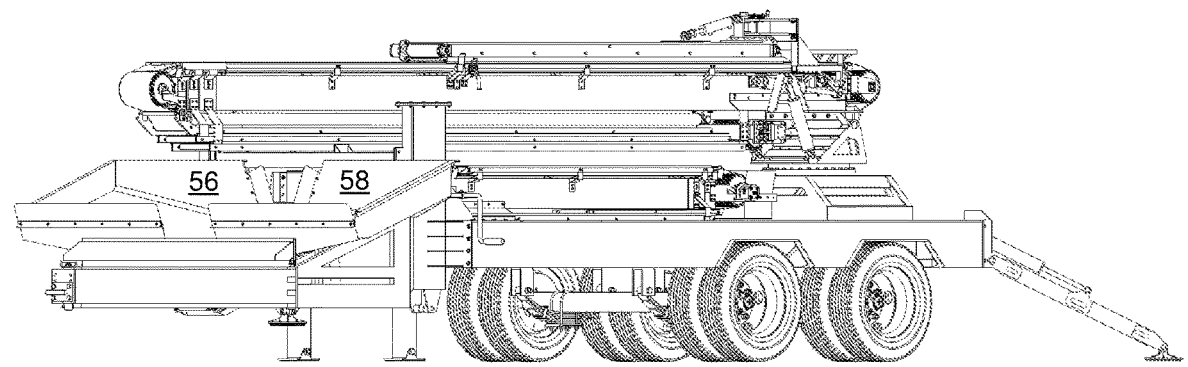
FIG. 10 is a front left view in perspective illustrating an embodiment of the present invention transitioning from a transport mode to an operational mode by lowering the guide plates of the hopper.
Figure 11:
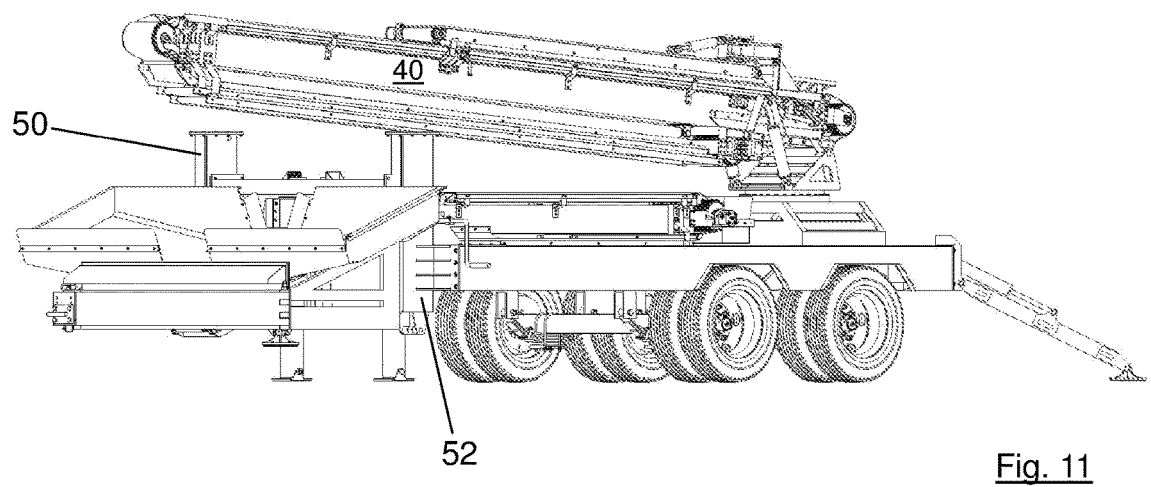
FIG. 11 is a front left view in perspective illustrating an embodiment of the present invention transitioning from a transport mode to an operational mode by raising the primary conveyor away from the feed conveyor.
Figure 12:
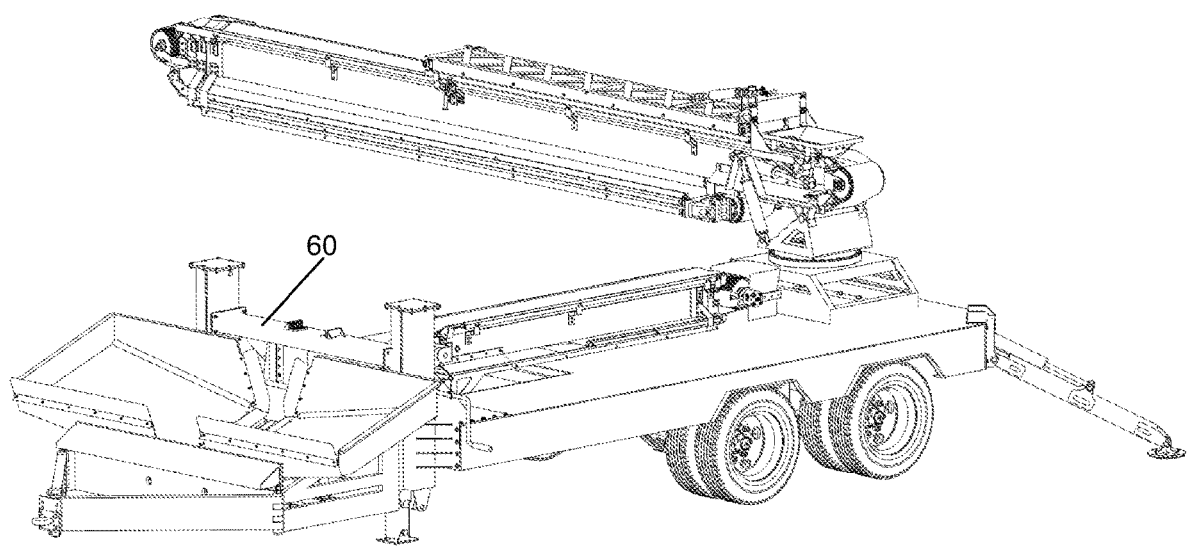
FIG. 12 is a front left view in perspective illustrating an embodiment of the present invention transitioning from a transport mode to an operational mode by rotation of the primary conveyor.
Figure 13:
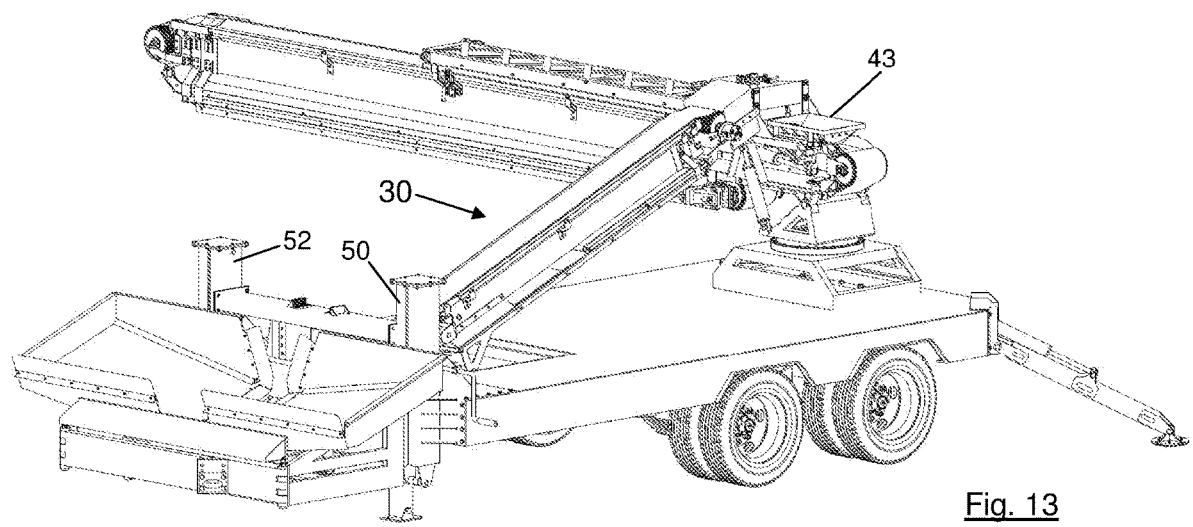
FIG. 13 is a front left view in perspective illustrating an embodiment of the present invention transitioning from a transport mode to an operational mode by tilting the feed conveyor upwardly.

The next preferred step is for the hopper's lateral guide plates 56 and 58 to be displaced to lower positions until the foot 62 rests upon the ground, as shown in FIGS. 8 and 10, by actuating the rams 56r and 58r to shorten in a conventional manner. This is preferably followed by the primary conveyor 40 being pivoted upwardly from its resting position on the support bar 60 by extending the rams 44 and 46 in a conventional manner. Once the primary conveyor 40 is pivoted to a pitch of about 5 degrees relative to horizontal, in order to clear the tops of the sleeves 50 and 52, the primary conveyor 40 may be rotated relative to the longitudinal axis of the apparatus 10 to a position shown in FIG. 12. This is at about a 90 degree angle relative to the longitudinal axis of the apparatus 10. Once the primary conveyor 40 is rotated sufficiently to the side relative to the longitudinal axis of the deck 12, the feed conveyor 30 has sufficient overhead clearance that it may be pivoted upwardly to or near the position shown in FIG. 13. Prior to raising and rotating the primary conveyor 40, there is insufficient clearance above the feed conveyor 30 for the feed conveyor 30 to be raised without impacting the primary conveyor 40. The portion of the feed conveyor 30 that is pivoted upwardly may be the pivoting portion 30p in one embodiment, and this may pivot by extension of the conventional ram 34. The pivoting portion 30p is then substantially parallel to the hopper portion 30h, as shown in FIG. 8.

Once the feed conveyor 30 is pivoted sufficiently upwardly, it is spaced a sufficient distance from the deck 12 that the combination of the feed conveyor 30 and the hopper 20 may be vertically translated downwardly by actuating the rams 50r and 52r to extend. Because the hopper 20 and feed conveyor 30 are linked at the pivot 32 and the ram 34, the hopper 20 and feed conveyor 30 move downwardly as a single unit. These components also move upwardly as a unit upon contraction of the rams 50r and 52r. When the rams 50r and 52r displace the plates 50p and 52p relative to the sleeves 50 and 52, the frame 54, which attaches to the plates 50p and 52p and the hopper 20, is also displaced. Thus, the hopper 20 is raised and lowered with the hopper 20 and the feed conveyor 30 as a unit. In the transition to operation mode, the hopper 20 and feed conveyor 30 are lowered to the position in FIG. 8 until the foot 62 thereby rests upon the ground. The foot 62 transfers at least some of the weight of the hopper 20, feed conveyor 30 and the fluent material poured into the hopper 20 to the ground, G.

Figure 7:
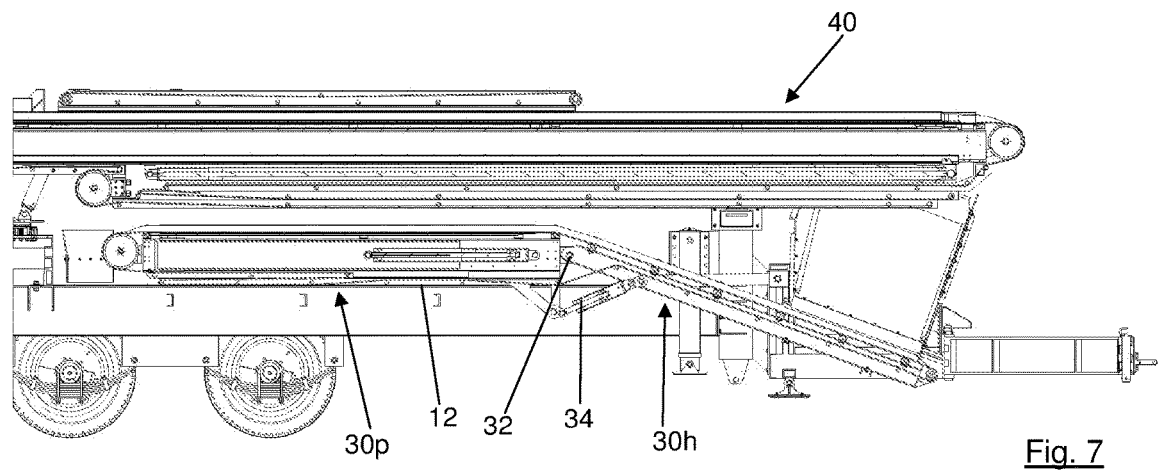
FIG. 7 is a magnified right side view in section through the line B-B of FIG. 3 illustrating an embodiment of the present invention in a transport mode.
Figure 14:
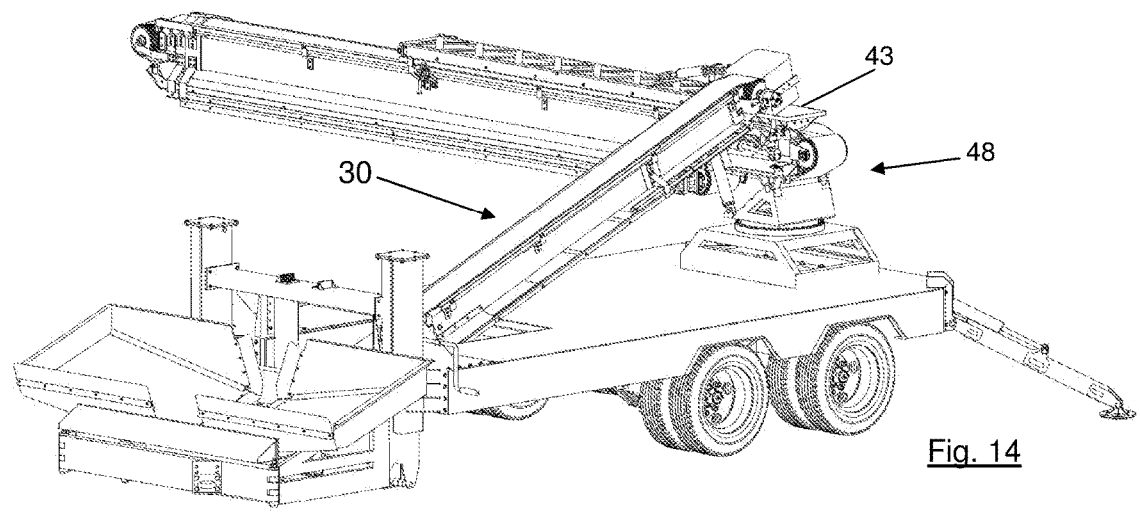
FIG. 14 is a front left view in perspective illustrating an embodiment of the present invention transitioning from a transport mode to an operational mode by elongation of the feed conveyor and the primary conveyor.

As is apparent from FIG. 3, the deck 12 has a void 12v that extends centrally along the deck 12 length near the rear of the deck 12. The void 12v is laterally at least as wide as, or wider than, the feed conveyor 30 and, in some embodiments, extends about one-third to one-half the length of the deck 12 in order to accommodate the vertical movement of the feed conveyor 30. FIG. 8 particularly shows the feed conveyor 30 occupying at least a portion of the void 12v. In FIG. 7 the combination of the feed conveyor 30 and the hopper 20 are in transport mode, wherein the pivoting portion 30p rests upon the deck's 12 upwardly-facing surface. In FIG. 8, the pivoting portion 30p is angled relative to horizontal, and the conveyor 30 and hopper 20 have been lowered as a unit until the foot 62 of the hopper 20 contacts the ground, G, upon which the outriggers rest (the position of one of the outriggers is illustrated in FIG. 14). Upon lowering, the weight of the hopper 20 and feed conveyor 30 may be supported at least in part by the ground, G, through the foot 62 and the two legs 22 and 24. Thus, in operation mode, the foot 62 is lowered via the adjustability in height of the hopper 20 and the feed conveyor 30 to make substantial contact with the ground, G, thereby allowing at least some of the weight of material deposited into the hopper 20 to be supported by the ground.

As shown in FIG. 14, the feed conveyor 30 may be extended so that its distal end (farthest from the hopper 20) extends over or near the end of the primary conveyor 40 that is above the turret mechanism 48. The extension must be sufficient that material driven by the feed conveyor 30 from the hopper 20 is dispensed substantially entirely onto the pivoting end of the primary conveyor 40. A funnel 43 may be mounted in the region where material is deposited to guide the material onto the primary conveyor's endless loop belt that operates in a conventional manner for a conveyor. The primary conveyor 40 may then be extended, angled relative to horizontal, and/or rotated relative to the longitudinal axis of the deck 12 to position the distal end of the primary conveyor 40 where the material conveyed from the hopper 20 is to be dispensed.

Figure 15:
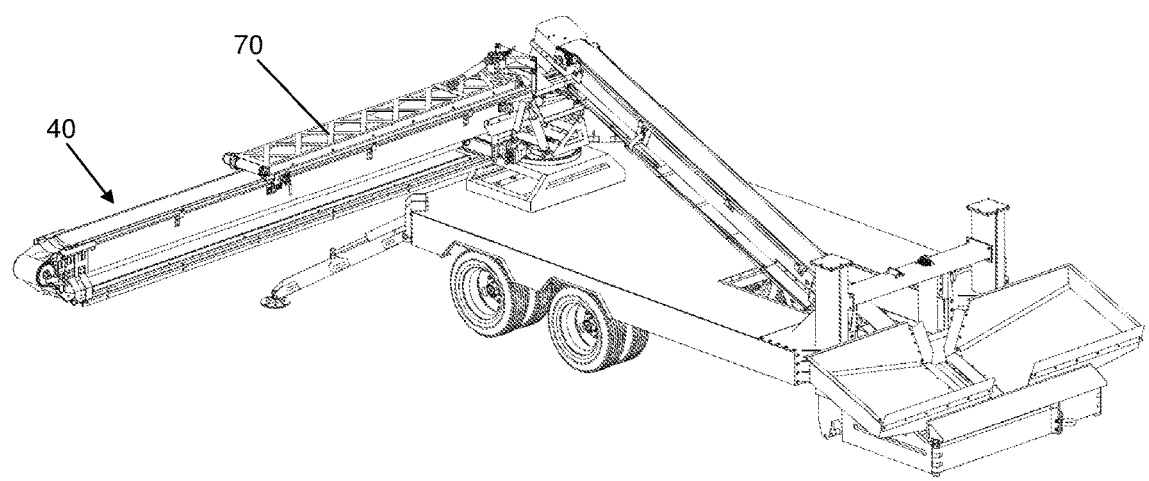
FIG. 15 is a view in perspective illustrating an embodiment of the present invention in operational mode.

Once the apparatus 10 is in the operation mode as illustrated in different configurations in FIGS. 14-16, material that is placed in the hopper 20 may flow down onto the feed conveyor 30, be conveyed upwardly by the feed conveyor 30 and be deposited on the end of the primary conveyor 40 mounted to the deck 12. The primary conveyor 40 may be rotated, angled, and/or extended so that its distal end is positioned relative to a dispensing location in such a position that the material is deposited where desired. Typically material is placed in the hopper 20 by a dump truck, cement mixer or another vehicle placing particulate, aggregate or slurry material in the hopper 20 by pouring. In other embodiments, other transport structures may be used.

During pouring of the material into the hopper 20, the guide plates 56 and 58, which are preferably lowered and as wide as possible, are slanted toward the center where the gap in the center of the hopper 20 permits the fluent material to pass down onto the hopper portion 30h that conveys the material along the upwardly angled feed conveyor 30 toward the primary conveyor 40. Upon reaching the distal end of the feed conveyor 30, the material drops downwardly, and possibly with a horizontal component if the velocity is sufficient, onto the primary conveyor 40, which conveys the material toward the opposite, distal end of the primary conveyor 40 and dispenses the material therefrom.

In a preferred embodiment, the position of the feed conveyor's 30 distal end, which is the end nearest the primary conveyor 40, relative to the primary conveyor's closest end is detected by a central computer (not shown) that also detects the degree of rotation and pitch of the primary conveyor 40. These positions can be detected by position or proximity sensors, servo-motors used to position the conveyors 30 and 40, or any other conventional detection means. The central computer controls all actuators, prime movers and any other means on the apparatus 10 that causes or permits movement. The central computer is programmed to prevent most or all actuations that would endanger a user or damage any component of the apparatus 10. As an example, neither of the conveyors is actuated to move fluent material until the programmed requirements for conveyor actuation are met. Such requirements may include rotation within a maximum range when the primary conveyor 40 is at a particular pitch. For example, if the highest end of the feed conveyor 30 must be horizontally positioned within two inches of the center of the primary conveyor 40 to prevent spillage, then the prime movers that displace the feed conveyor 30 and primary conveyor 40 are not actuated by the computer until this condition, along with any other programmed conditions, are met. It is also contemplated to have programmed requirements for operation relating to whether the outriggers are deployed sufficiently, whether the deck 12 is substantially level, and many other parameters that will become apparent to the person having ordinary skill from the description herein.

Before, during and after operation of the feed conveyor 30 and the primary conveyor 40, the primary conveyor 40 may be rotated, extended and/or angled to most preferably position the distal end. This is for the purpose of locating where the conveyed material is dispensed at the distal end. Thus, the conveyor 40 may be extended from the transport length shown in FIG. 15 to the operation length shown in FIG. 16 at any time, as long as the programmed conditions for safe operation are met. Furthermore, the primary conveyor 40 may be rotated from the position shown in FIG. 15 to the position shown in FIG. 16 before, during or after material is conveyed along the primary conveyor 40. The primary conveyor 40 may be rotated, extended and tilted simultaneously, as controlled by a conventional, preferably wireless controller that is well known in the industry for a human user manually operating the movement of conventional conveyer equipment. Such a controller has switches and knobs on a hand-held device that electronically communicates wirelessly with the central computer of the apparatus 10 in a conventional manner. From the description herein, the person of ordinary skill will understand the infinite number of configurations that the apparatus 10 is capable of achieving for desired movement of fluent material by the apparatus 10.

As illustrated in FIGS. 15-21, one embodiment includes an auxiliary conveyor 70 pivotably mounted to the end of the primary conveyor 40 that is closest to the pivot axle 42 and turret mechanism 48. The auxiliary conveyor 70 is positioned substantially parallel to, and adjacent, the primary conveyor 40 when in transport mode, as well as in some embodiments when material is conveyed along the primary conveyor 40. While the material is conveyed on the primary conveyor 40 with the auxiliary conveyor 70 in the position shown in FIGS. 15-16, the material is conveyed through a "tunnel" formed by the active primary conveyor 40 on the bottom and the passive auxiliary conveyor 70 on the top. The auxiliary conveyor 70 is simply stored in this position and may not provide any function to the operation of the primary conveyor 40 when in this position.

Figure 18:
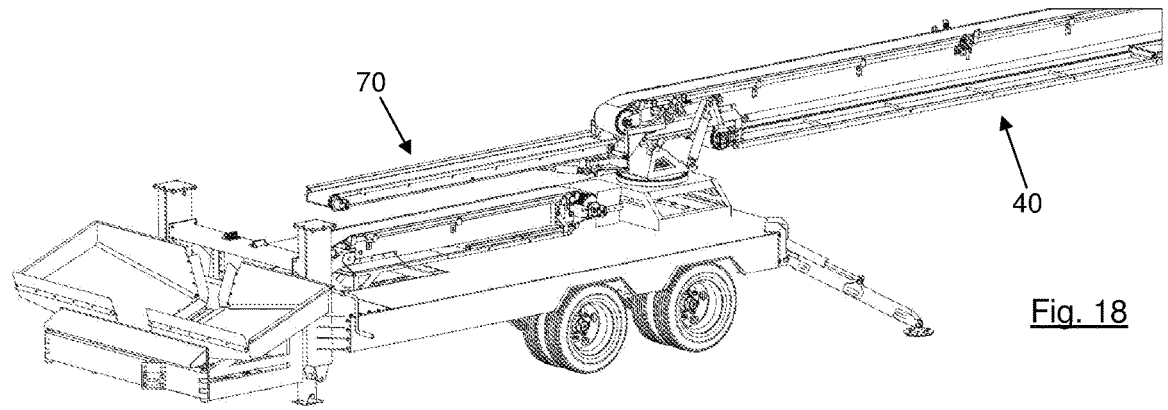
FIG. 18 is a view in perspective illustrating an embodiment of the present invention in another operational mode.
Figure 19:
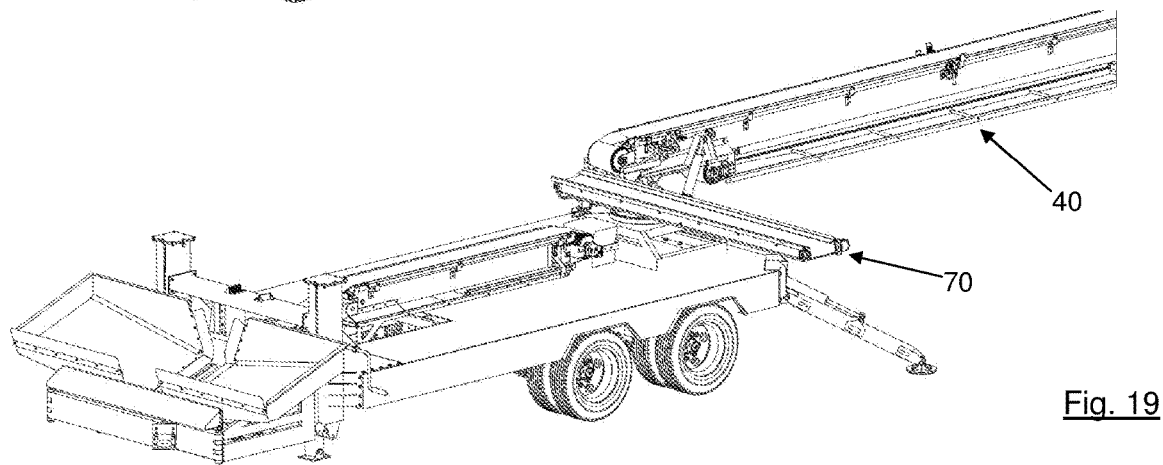
FIG. 19 is a view in perspective illustrating an embodiment of the present invention in another operational mode.
Figure 20:
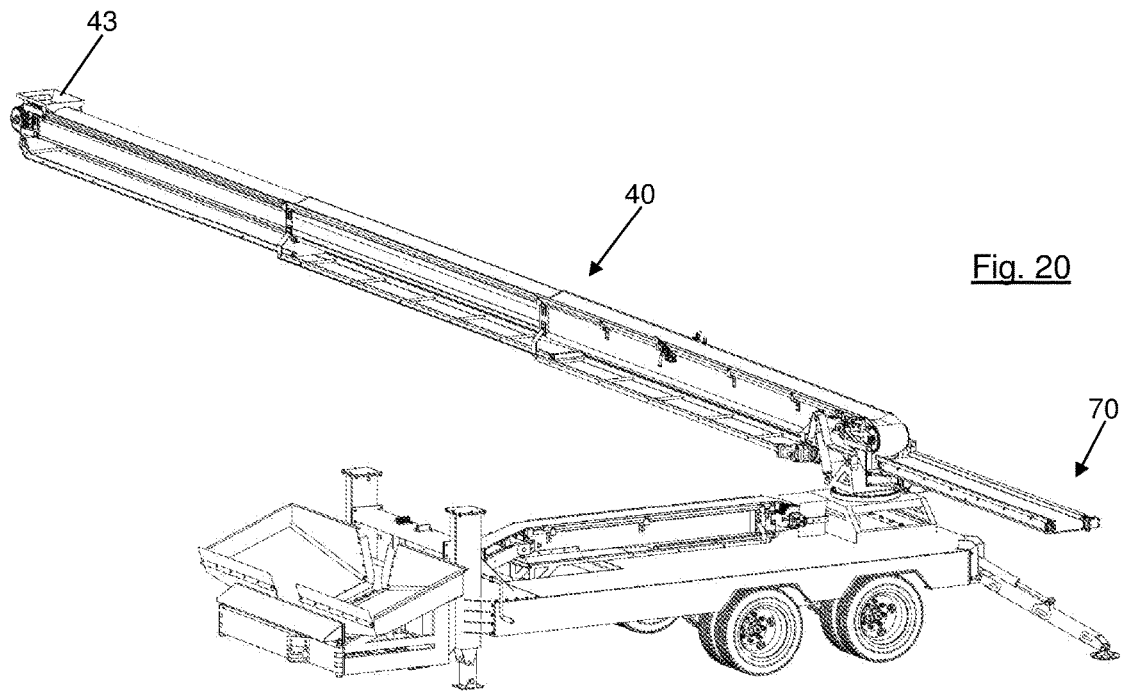
FIG. 20 is a view in perspective illustrating an embodiment of the present invention in another operational mode.
Figure 21:
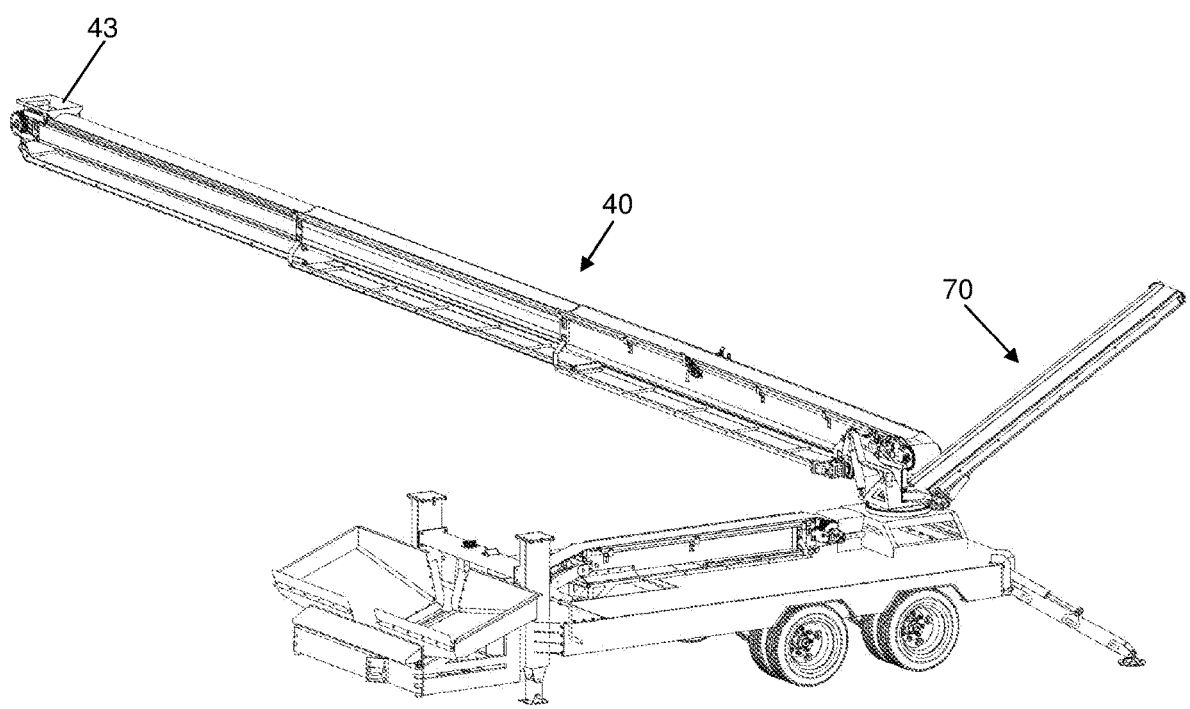
FIG. 21 is a view in perspective illustrating an embodiment of the present invention in another operational mode.

The auxiliary conveyor 70 provides another means by which fluent material may be conveyed by the apparatus 10, as will now be described. Prior to use of the auxiliary conveyor 70, the feed conveyor 30 is preferably pivoted down to, or near, the transport position. The auxiliary conveyor 70 may then be pivoted relative to the primary conveyor 40 (see FIGS. 17-19) from its transport position toward an operational position about a substantially horizontal axis. The auxiliary conveyor 70 may have a useful range when it is pivoted from its stored (transport) position to an angle of between about 160 and 195 degrees relative to the longitudinal axis of the primary conveyor 40. It is contemplated that this useful range may be from 135 to 270 degrees in some embodiments. Thus, when the auxiliary conveyor 70 is angled relative to the primary conveyor by 170 degrees and 180 degrees, the auxiliary conveyor 70 is within the useful range. FIG. 18 shows the auxiliary conveyor 70 pivoted about the horizontal axis at an angle of about 180 degrees relative to the primary conveyor 40, and FIG. 19 shows the auxiliary conveyor pivoted about the horizontal axis at a similar angle, but rotated about a substantially vertical axis by about 90 degrees. FIGS. 20 and 21 show the auxiliary conveyor 70 at other positions relative to the primary conveyor 40 to illustrate some of the flexibility in positioning the auxiliary conveyor 70.

The auxiliary conveyor 70 has a useful range of pivoting relative to the primary conveyor 40, and a useful range of pivoting relative to the horizon or the plane of the deck 12. It is contemplated that the useful range of the auxiliary conveyor 70 relative to horizontal is between 30 degrees and minus 15 degrees. In one embodiment, the auxiliary conveyor 70 may be at an angle of 180 degrees relative to the primary conveyor 40, and, depending upon the angle of the primary conveyor 40 relative to horizontal, the auxiliary conveyor 70 is preferably within 30 degrees to minus 15 degrees relative to horizontal.

One purpose of the auxiliary conveyor 70 is to provide additional uses for the apparatus 10. It is not uncommon for a construction worker to have the need to convey material from one location, and the subsequent need to move material from that same (or a nearby) location to the apparatus 10. The auxiliary conveyor 70, in combination with the primary conveyor 40, provides the ability to perform this function. The auxiliary conveyor 70 is actuated to convey the material further away from the primary conveyor 40 using a conventional conveyor belt system to dispense the material where the distal end of the auxiliary conveyor 70 is located. For example, if one wishes to convey concrete slurry to a fabricated form where a concrete pad is to be constructed, one is likely to have excess gravel or soil that must be removed, prior to pouring the concrete, from the area surrounding the form. Therefore, the operator of the apparatus 10 may configure the conveyors 30, 40 and 70 as shown in FIG. 21 to permit an operator of the machine to place material on the distal end of the primary conveyor 40 (farthest from the auxiliary conveyor 70), and then actuate the primary conveyor 40 in reverse from that described when used with the feed conveyor 30, which causes the material to drop onto the auxiliary conveyor 70, which further conveys the material away from the primary conveyor 40.

After this work is completed, the auxiliary conveyor 70 may be pivoted about the horizontal axis to return to its transport position (FIG. 15), the pivoting portion 30p may be pivoted upwardly, and the hopper 20 and the feed conveyor 30 may be translated downwardly as a unit until the hopper's foot 62 (FIG. 8) is seated against the ground or other support. Then the feed conveyor 30 may be extended until it is in position for operation with the primary conveyor. Concrete may be poured into the hopper 20 and then conveyed to the site where the concrete form has been constructed—at the distal end of the primary conveyor 40.

It is contemplated that the funnel 43 may be moved from one end of the primary conveyor 40 to the opposite end when using conventional excavation equipment to place material on the primary conveyor 40 that is then conveyed to the auxiliary conveyor 70. Therefore, when the primary conveyor 40 is in the configuration to be used with the feed conveyor 30, the funnel 43 may be mounted at the appropriate end (see FIGS. 13-14). Alternatively, the funnel 43 may be moved to the appropriate end when the auxiliary conveyor 70 is deployed (see FIGS. 20-21).

Once the apparatus 10 has completed its purpose at the construction site, or if it needs to be moved on or around the site, it may transition from the operation mode to the transport mode (FIGS. 1-6) by reversing the steps above for transitioning form transport to operation mode, and then may be transported as needed. In one embodiment, the apparatus 10 is towed by a truck or other vehicle. It will be understood that the deck 12 and axles and wheels 14 can be a deck and axles of a vehicle, such as a truck. For example, the deck of a truck, which has axles and wheels that are driven by an engine, could be used in place of the deck 12 and axles and wheels 14 if that is advantageous. Different embodiments of the present invention may include a material transport system that is mountable to a mobile base such as a trailer or a vehicle. Those knowledgeable in the art will readily appreciate the many alternative configurations and equivalent elements that are within the scope of the invention.

In one embodiment, the hopper 20 may have a vertical range of movement of about eighteen inches, and the bottom of the foot 62 may be about ten inches above the ground G when the apparatus 10 is in transport mode on level ground. To place the apparatus 10 in operation mode on level ground, the hopper 20 is lowered by about ten inches to make contact with the ground, G. In this condition, the feed conveyor 30 may be limited to an extension of up to about 30 inches from the fully retracted configuration typical of the transport mode. The feed conveyor may also be limited to an angle from horizontal (level with the deck 12) of about 22.5 degrees.

In an embodiment when the hopper 20 and feed conveyor 30 are lifted as a unit to their extreme highest position, which may require raising the hopper 20 to its highest extreme (about five inches above its transport mode position), the feed conveyor 30 may be limited to 26 inches of extension from fully retracted, and the angle of the feed conveyor 30 may be limited to 17.5 degrees from horizontal.

In an embodiment when the hopper 20 and feed conveyor 30 are lowered as a unit to their extreme lowest position, which may require lowering the hopper 20 to its lowest extreme (about thirteen inches below its transport mode position), the feed conveyor 30 may be limited to 36 inches of extension from fully retracted, and the angle of the feed conveyor 30 may be limited to 25 degrees from horizontal.

In one embodiment, with the feed conveyor in operating position (e.g., hopper 20 lowered to extreme lowest position and feed conveyor 30 extended 36 inches at pitch of 25 degrees), the primary conveyor 40 may be limited in rotation to about 270 degrees from one extreme to the opposite, and in pitch from between 30 degrees to minus 15 degrees. In one embodiment, with the feed conveyor in transport position, the primary conveyor 40 may be unlimited in rotation when the pitch is between about 30 degrees and 5 degrees. Under these conditions, the primary conveyor 40 may be limited in rotation to about 270 degrees when the primary conveyor is between about 4 degrees and minus 15 degrees pitch.

In one embodiment, the primary conveyor's 40 pitch is limited to a maximum of about 20 degrees from horizontal when the auxiliary conveyor 70 is deployed. When the primary conveyor 40 has a pitch of 20 degrees, the auxiliary conveyor 70 may be deployed by pivoting it about a horizontal axis a minimum of about 160 degrees from its stowed position, when the auxiliary conveyor 70 is parallel to and contained within the ends of the primary conveyor 40 as shown in FIG. 15. From this minimum deployed pitch of 160 degrees relative to the primary conveyor 40, the auxiliary conveyor 70 may rotate about the horizontal axis (relative to the primary conveyor 40) to be angled relative to horizontal or the deck 12 between 30 degrees and minus 15 degrees so that the auxiliary conveyor 70 meets the requirements for safe operation. The deployed auxiliary conveyor 70 can then rotate about 180 degrees along an axis that is substantially perpendicular to the longitudinal axis of the primary conveyor 40 and that is substantially vertical. This rotation may be about 90 degrees to one side (as shown in FIG. 19) and 90 degrees to the opposite side. This range may vary by increasing or decreasing the maximum by as much as 15 degrees.

In one embodiment, the primary conveyor's 40 pitch is limited to a minimum of about minus 15 degrees from horizontal when the auxiliary conveyor 70 is deployed. When the primary conveyor 40 has a pitch of minus 15 degrees, the auxiliary conveyor 70 may be deployed by pivoting it about a horizontal axis about 195 degrees from its stowed position (parallel to and contained within the ends of the primary conveyor 40). From this deployed pitch, the auxiliary conveyor 70 may rotate about the horizontal axis (relative to the primary conveyor 40) to be angled relative to horizontal or the deck 12 between 30 degrees and minus 15 degrees so that it meets the criteria for safe operation. The deployed auxiliary conveyor 70 can then rotate about 180 degrees along an axis that is substantially perpendicular to the longitudinal axis of the primary conveyor 40 and that is substantially vertical. This rotation may be about 90 degrees to one side (as shown in FIG. 19) and 90 degrees to the opposite side. This range may vary by increasing or decreasing the maximum by as much as 15 degrees.

The hopper frame 54 to which the hopper components are mounted is considered part of the hopper 20. The sleeves 50 and 52 that are rigidly mounted to the deck 12 are considered part of the deck 12. The term "drivingly linked" includes when components are interposed between two other components.

The apparatus 110 shown in FIGS. 23-32 is an alternative embodiment and has a base 112, a primary conveyor 180, and a hopper 120 similar to those on the apparatus 10. There are other structures that are similar, or identical, to structures on the apparatus 10. Unless otherwise noted, structures on the apparatus 10 that are similar, or identical, to structures on the apparatus 110 are not described again.

Figure 25:
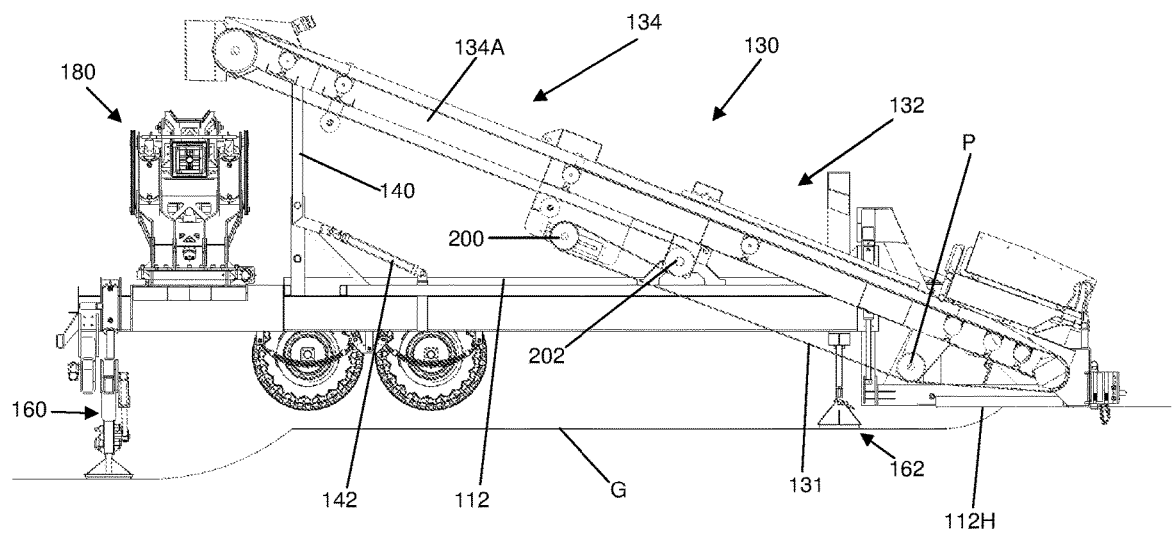
FIG. 25 is a schematic side view in section illustrating the embodiment of FIG. 23 taken through the line D-D of FIG. 34.

The components of the feed conveyor 130 on the apparatus 110 may differ from the components of the feed conveyor 30 on the apparatus 10. The feed conveyor 130 has at least a pivoting segment 132 and an extending segment 134. The pivoting segment 132 is pivotably mounted to the base 112 near the second base end, which may be the right end in the orientation of FIG. 22, which may also be the front end of the trailer or vehicle. The axis about which the pivoting segment 132 pivots may be at any chosen orientation, including horizontal as shown in the illustrations. The pivot may be formed by a conventional hinge, having a single axis, or a spherical joint, such as a ball joint. Any mechanism that can permit pivoting of the feed conveyor 130 at least vertically relative to the base 112 is suitable. As further shown in FIG. 24, the pivoting segment 132 is pivotably mounted to the hopper base 112H to rotate about an axis, P. The hopper base 112H is a portion of the base 112, and is further vertically moveable relative to the rest of the base 112 in a manner, and by mechanisms, similar to the mechanisms that cause the frame 54 and associated structures to move vertically. The hopper base 112H may rest upon the ground to support the apparatus 110 as shown in FIG. 25, or may be disposed above the ground with the base 112 supported at a position spaced above the ground by outriggers 160 or other supports 162.

At least one portion of the pivoting segment 132 is disposed beneath the hopper 120, which is similar to the hopper 20. In the apparatus 110, the end of the pivoting segment 132 that is farthest from the primary conveyor's 180 rotary connection with the base 112 is disposed beneath the hopper 120. With this configuration, material placed in the hopper 120 may fall downward onto the end of the conveyor belt 131 (FIG. 28) that extends around both of the segments 132, 134 in a manner similar to the conveyor belt of the feed conveyor 30.

The extending segment 134 is longitudinally-movably mounted to the pivoting segment 132, preferably at the end of the pivoting segment 132 farthest from the pivot, P, and extends toward the primary conveyor 180. The extending segment 134 is preferably slidably mounted to the pivoting segment 132, in a telescopic relationship, such as by one of the segments 132, 134 slidingly inter-fitting within the other of the segments 132, 134. In one embodiment, the extending segment 134 has side members 134A and 134B that insert into correspondingly-shaped openings in the pivoting segment 132, which openings are slightly larger than the side members 134A and 134B. Solid surfaces made of low-friction material, wheels, roller bearings, or other bearing surfaces allow the side members to slide with little friction relative to the surfaces that define the openings. Thus, the extending segment 134 may move longitudinally into and out of the openings in the pivoting segment 132 with little resistance, and the combination of the segments 132 and 134 pivots relative to the hopper base 112H, and the remainder of the base 112.

Figure 28:
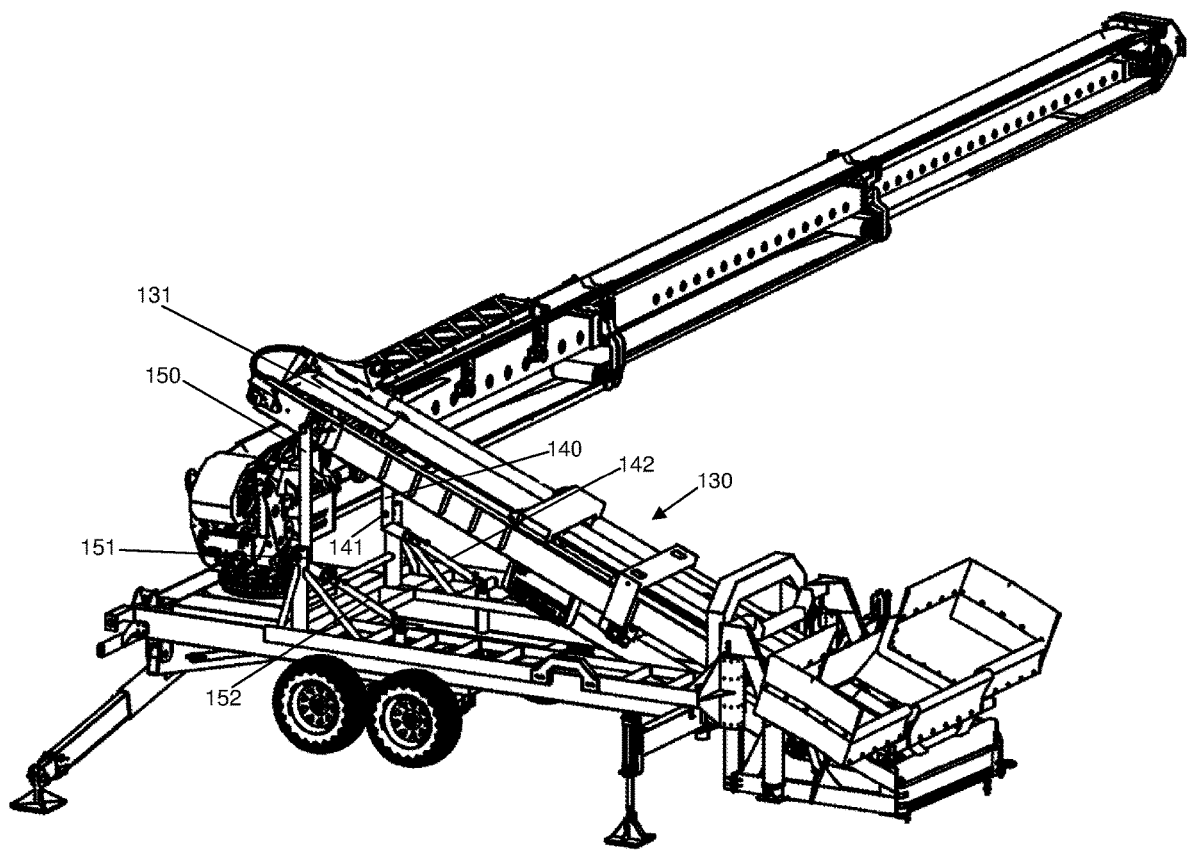
FIG. 28 is a view in perspective illustrating the embodiment of FIG. 23 in operation mode.

At least one arm is, and preferably the arms 140 and 150 are, mounted to the base 112, which may include structures integral to, and protruding from, the base 112. The arms 140 and 150 are preferably pivotably mounted to the base 112 at pivot axes 141 and 151, respectively, which are at the upper ends of support structures that extend upwardly from the platform of the base 112. The pivot axes 141 and 151 are preferably disposed at an intermediate position along the arms 140 and 150, leaving the opposing ends of each of the arms free for attachment to other structures. In the example of the apparatus 110, the respective top ends of the arms 140 and 150 may be mounted to the side members 134A, 134B of the extending segment 134, such as on opposite sides thereof, by conventional pivoting mounts. Furthermore, the respective lower ends of the arms 140 and 150 may be mounted to a prime mover, which may be one or more pneumatic or hydraulic rams, electric motors with screws, or other prime movers. In a preferred embodiment, the prime mover includes a first hydraulic ram 142 mounted to the lower end of the arm 140 and a second hydraulic ram 152 mounted to the lower end of the arm 150, as shown in FIG. 28. The rams 142, 152 are pivotably mounted to the base 112 at respective opposite ends, thereby permitting the rams to elongate and compress. During elongation, the rams rotate the arms 140, 150 in one direction, and during compression the rams rotate the arms in the opposite direction.

Upon actuation of the rams 142 and 152, the arms 140 and 150 are thus caused to pivot about the pivot axes 141 and 151, which causes both extension of the extending segment 134 and pivoting of the pivoting segment 132. Because the arms 140 and 150 pivot about the axes 141, 151, the top ends of the arms move along arcuate paths. The pivot connections of the arms 140, 150 on the opposite sides of the extending segment 134 follow the arcuate paths of the top ends of the arms 140, 150. This causes the extending segment 134 to move longitudinally relative to the pivoting segment 132 as the pivoting segment 132 pivots relative to the base 112 about the pivot, P. Therefore, movement of the arms 140, 150 by the hydraulic rams 142, 152 causes both pivoting of the pivoting segment 132 and extending of the extending segment 134 of the feed conveyor 130. This pivoting and extending movement displaces the extending segment 134 longitudinally relative to (into or out of) the pivoting segment 132, and pivots the pivoting segment 132 of the feed conveyor 130 relative to (up or down) the base 112. Because the extending segment 134 remains substantially parallel to the pivoting segment 132, when the pivoting segment 132 pivots relative to the deck 112, the extending segment 134 also moves through an arcuate path.

The pivoting segment 132 may be mounted to a hopper base 112H that is vertically moveable relative to that portion of the base 112 that supports the wheels and to which the primary conveyor 180 is mounted. The extending segment 134 is longitudinally movable relative to the pivoting segment 132, which may also be described as "telescopically" movable. The extending segment 134 preferably does not pivot relative to the pivoting segment 132, but is substantially parallel to the pivoting segment 132 and remains parallel as it extends into and away from the pivoting segment 132. Thus, the entire feed conveyor 130 may pivot only about the pivot, P of the pivoting segment 132, and the extending segment 134 may be the only portion of the feed conveyor 130 that is longitudinally movable relative to the base 112. Besides friction, there is little resistance to pivoting the feed conveyor 130 about the pivot P, and there is little resistance to longitudinally moving the extending segment 134 relative to the pivoting segment 132. Preferably, lubricated bearings are used to reduce the frictional resistance to relative movement.

The extending segment 134 may be moved by the arms 140, 150 that are pivotably mounted to the extending segment 134 at an end of the extending segment 134 that is farthest from the pivoting segment 132. The arms 140, 150 may be pivotably mounted to the base 112 at intermediate positions on the arms, and may be pivotably mounted to the hydraulic rams 142, 152, at the ends of the arms 140, 150 that are closest to the base 112. The rams 142, 152 may be pivotably mounted at first ends to the base 112 and at opposite ends to the lower ends of the arms 140, 150, respectively. By actuating the rams, the arms are rotated about the intermediate pivot points, and this rotation moves the extending segment 134 into or away from the pivoting segment 132, and pivots the entire feed conveyor 130 upwardly or downwardly relative to the base 112. Thus, the feed conveyor may be made up of two components that move relative to one another by applying a force only to the extending conveyor 134.

Each of the arms 140, 150 may be generally L-shaped, with a shorter lower section to which a respective one of the rams 142, 152 attaches, and a longer upper section that attaches to a respective side member of the extending segment 134. The pivots 141, 151 may be at the intersection of the shorter and longer sections.

The length of the longer sections of the arms 140, 150 is predetermined to cause the end of the extending segment 134 farthest from the pivot P to avoid contact with the primary conveyor 180 (when the primary conveyor 180 is in the predetermined position), and to be positioned over the primary conveyor 180 for dispensing particulate or slurry from the feed conveyor 130 onto the primary conveyor 180. Thus, the lengths of the portion of the arms 140, 150 between the pivots 141, 151 and their attachments to the extending segment 134, are carefully determined to ensure that the free end of the feed conveyor 130 pivots along an arc that extends from below and away from the primary conveyor 180 to directly above the primary conveyor 180. This prevents contact between the feed conveyor 130 and the primary conveyor 180, and positions the distributing end of the feed conveyor 180 in the appropriate position above the primary conveyor 180 for material to fall onto the primary conveyor 180 during operation.

Figure 26:
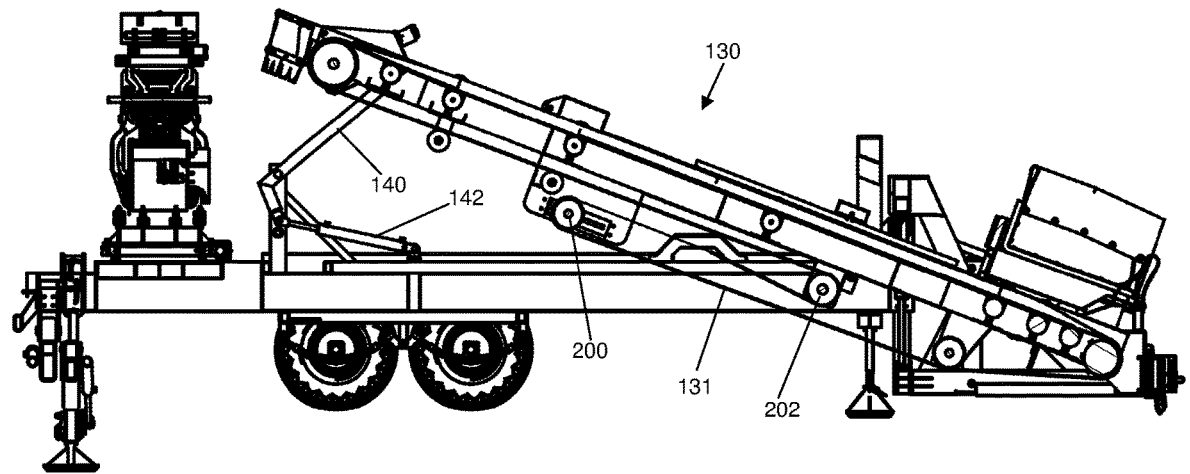
FIG. 26 is a schematic side view in section illustrating the embodiment of FIG. 23, as the feed conveyor is in a transition mode being moved toward the transport mode, taken through the line E-E of FIG. 35.
Figure 27:
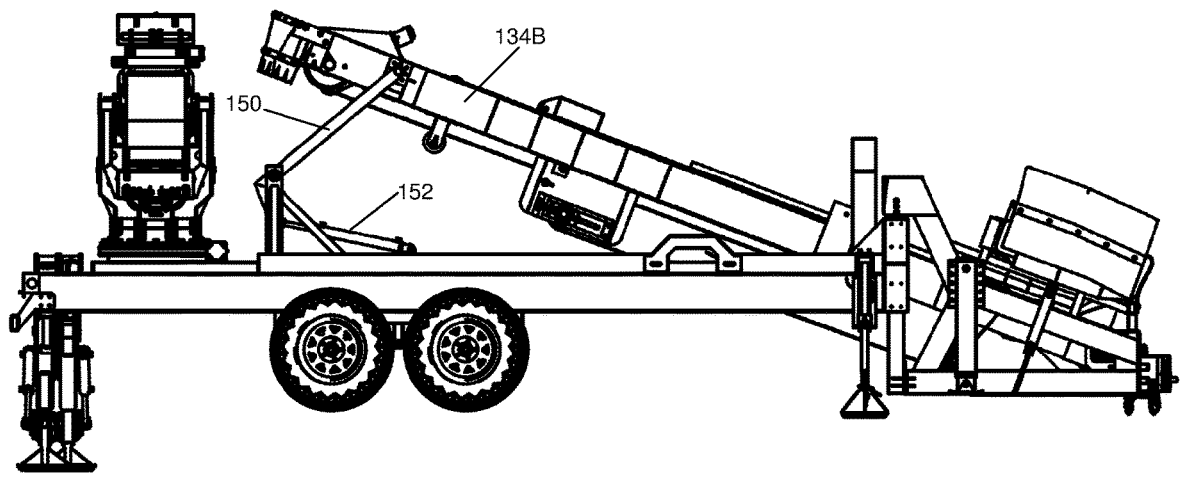
FIG. 27 is a schematic side view illustrating the embodiment of FIG. 23 as the feed conveyor is in a transition mode being moved toward the transport mode.

In FIGS. 25-27, the arms 140 and 150 are shown in two different positions as they rotate. In FIGS. 25-26, the arm 140 is visible on the far side of the apparatus 110, because FIGS. 25-26 are section views. In FIG. 27, the arm 150 is visible, and the arm 140, which is directly behind the arm 150, is hidden from view. FIG. 25 shows the feed conveyor 130 in the extended, operating position, in which the distal end is directly above the primary conveyor 180, and FIGS. 26-27 show the apparatus 110 partially compacted as the feed conveyor 130 is moved in a transition position by the arms 140, 150 toward the travel position. The path of the end of the conveyor 130 is moved through an arc from the operating position (FIG. 25) to a partially compacted position in FIGS. 26-27, by the arms 140, 150 being pivoted by the rams 142, 152, respectively. FIG. 27, which is not a section view, shows the side of the apparatus in a partially compacted position.

Figure 23:
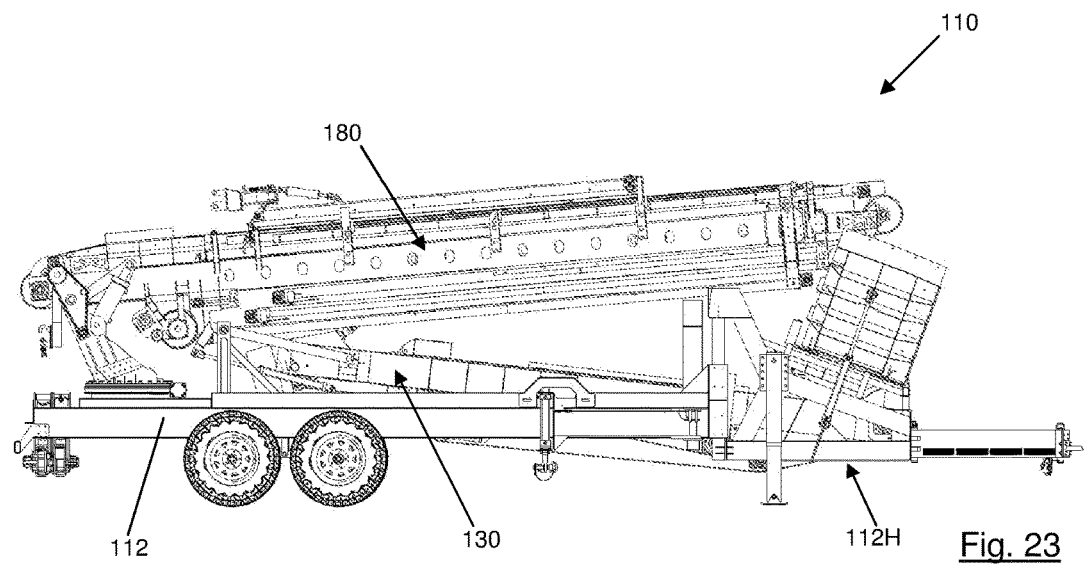
FIG. 23 is a side view illustrating an alternative embodiment of the present invention.
Figure 24:
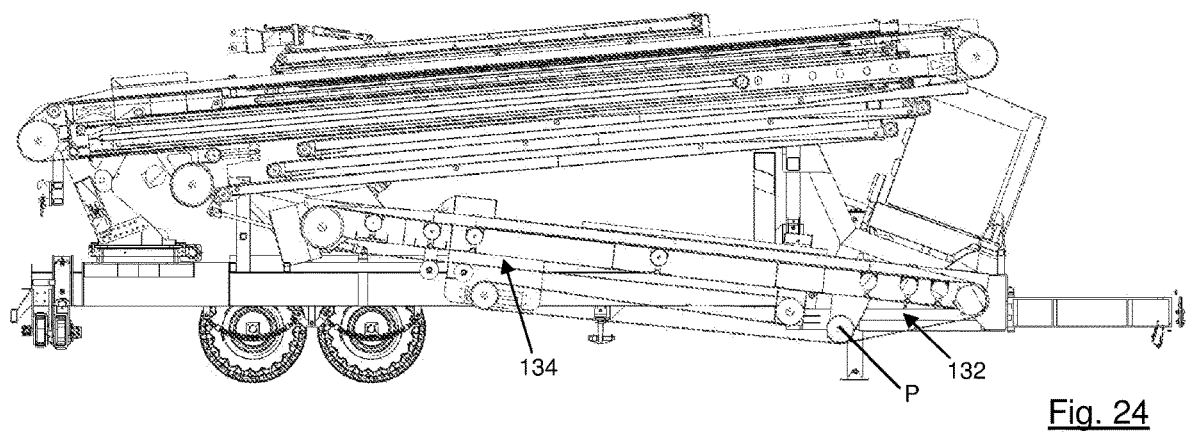
FIG. 24 is a side view in section illustrating the embodiment of FIG. 23 taken through the line C-C of FIG. 33.
Figure 29:
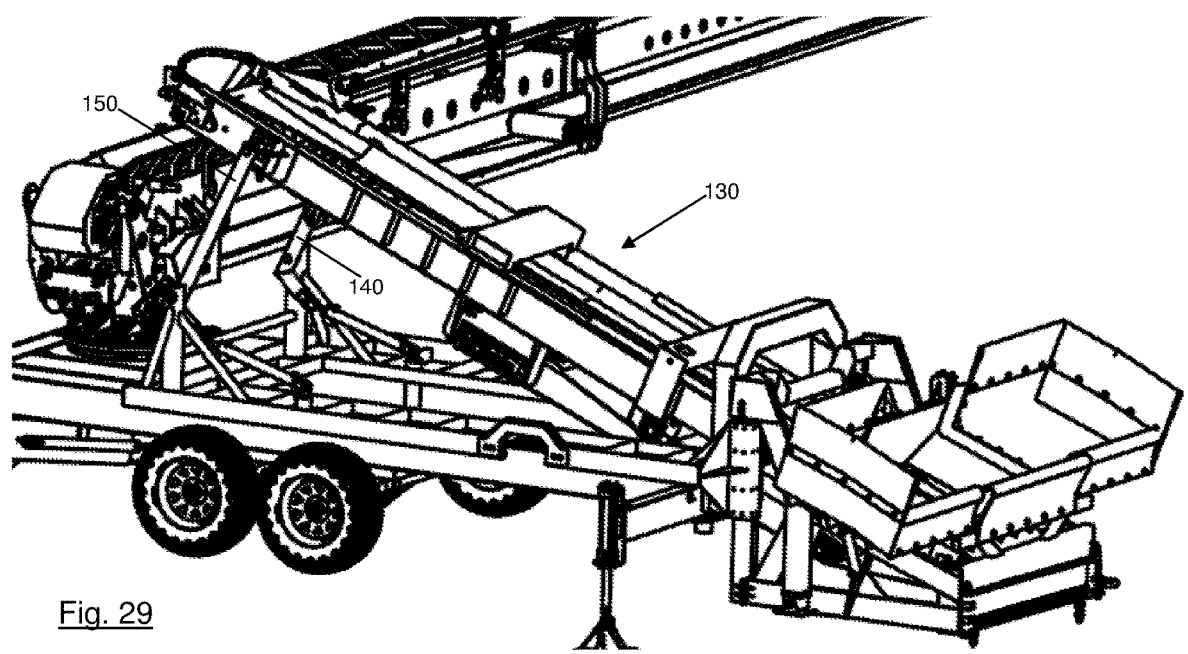
FIG. 29 is a magnified partial view in perspective illustrating the embodiment of FIG. 28 as the feed conveyor is in a transition mode being moved toward the transport mode.
Figure 30:
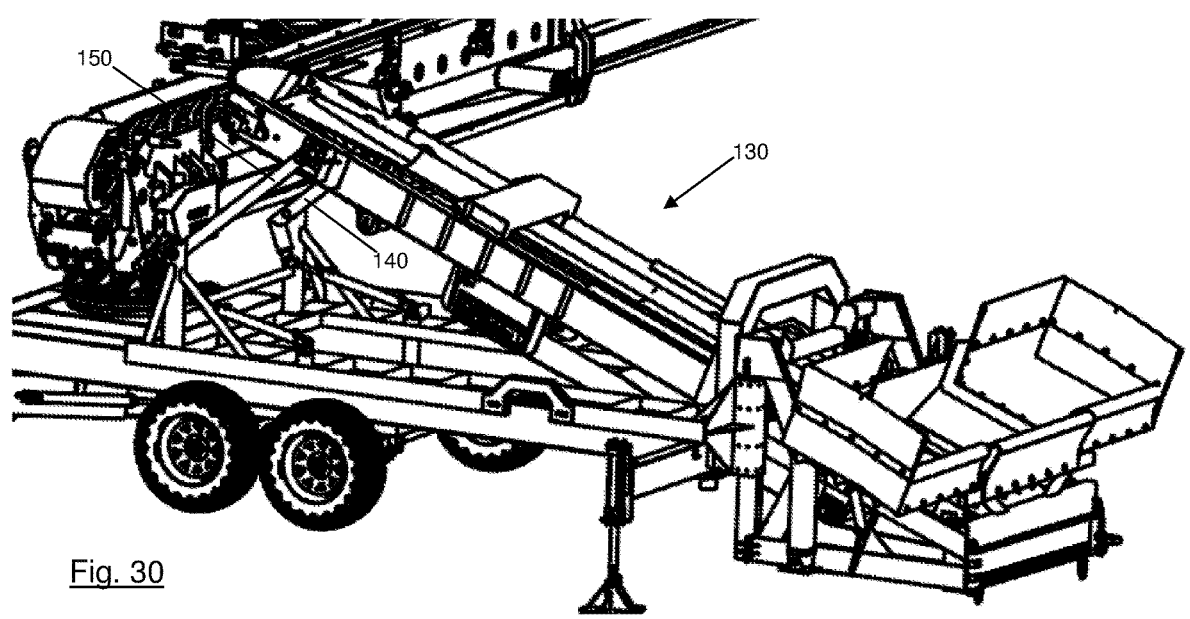
FIG. 30 is a magnified partial view in perspective illustrating the embodiment of FIG. 28 as the feed conveyor is in a transition mode being moved further toward the transport mode.
Figure 31:
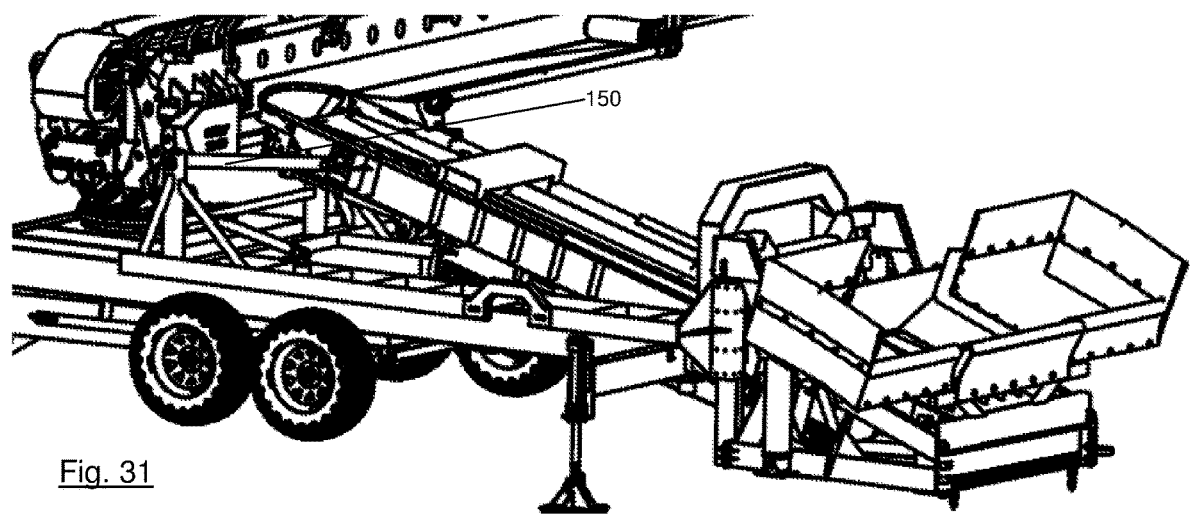
FIG. 31 is a magnified partial view in perspective illustrating the embodiment of FIG. 28 as the feed conveyor is in a transition mode being moved further toward the transport mode.
Figure 32:
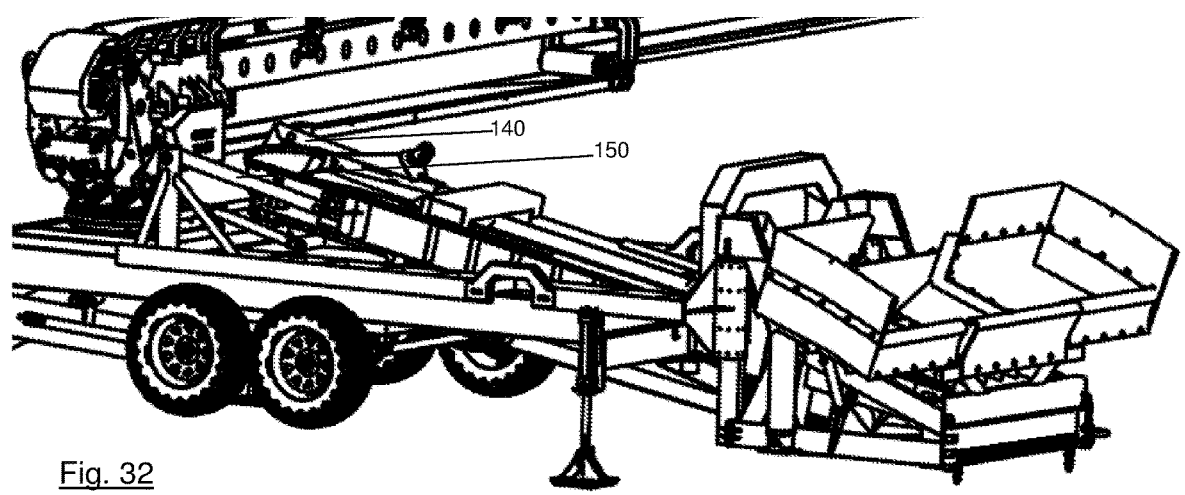
FIG. 32 is a magnified partial view in perspective illustrating the embodiment of FIG. 28 with the feed conveyor in the transport mode with other components in transition mode.
Figure 33:
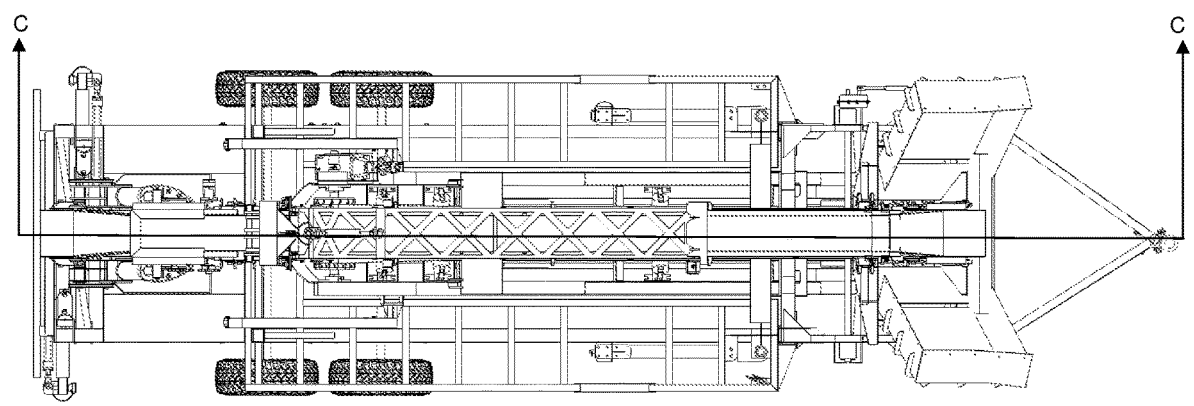
FIG. 33 is a plan view illustrating the embodiment of FIG. 23.
Figure 34:
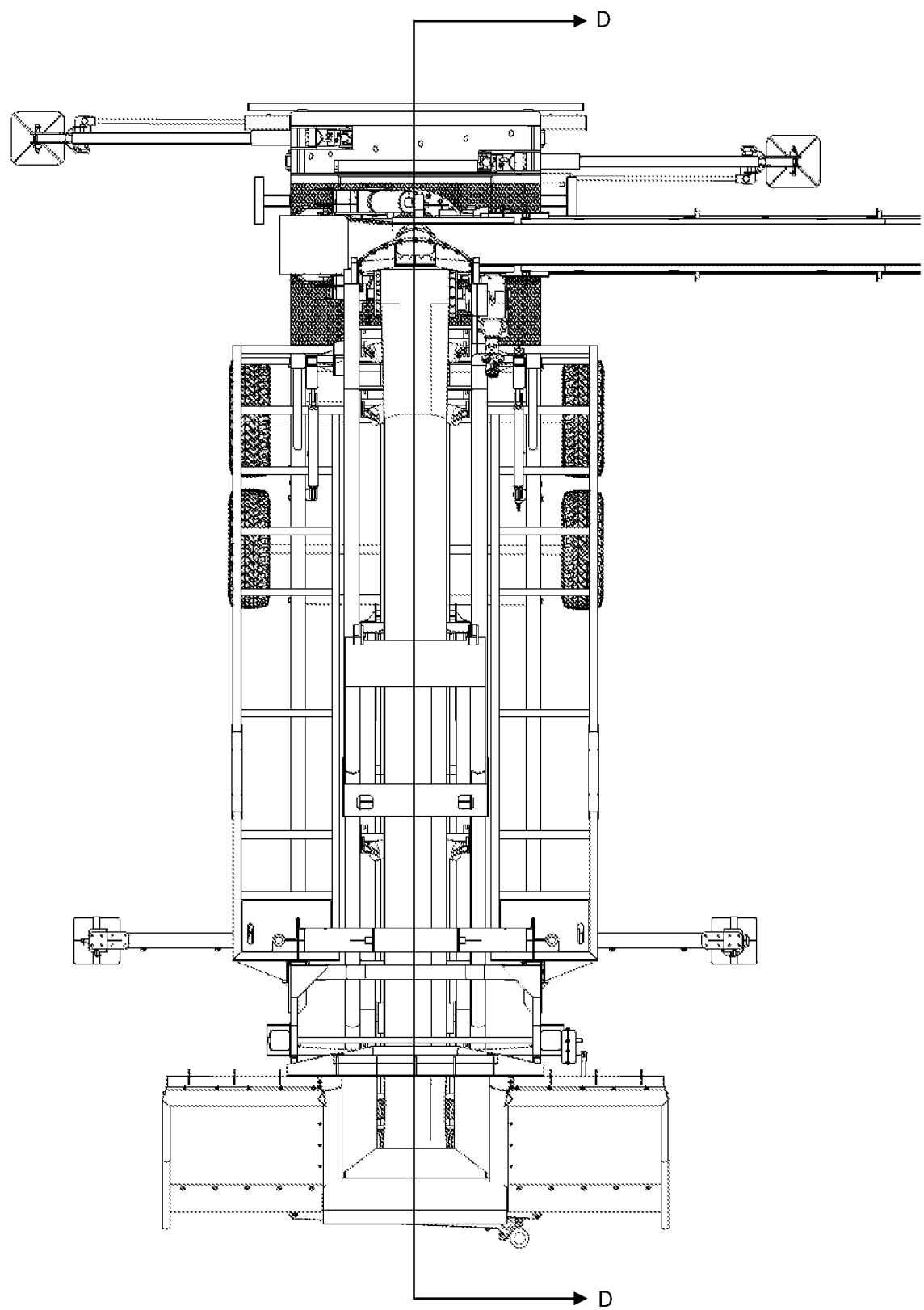
FIG. 34 is a plan view illustrating the embodiment of FIG. 23.
Figure 35:
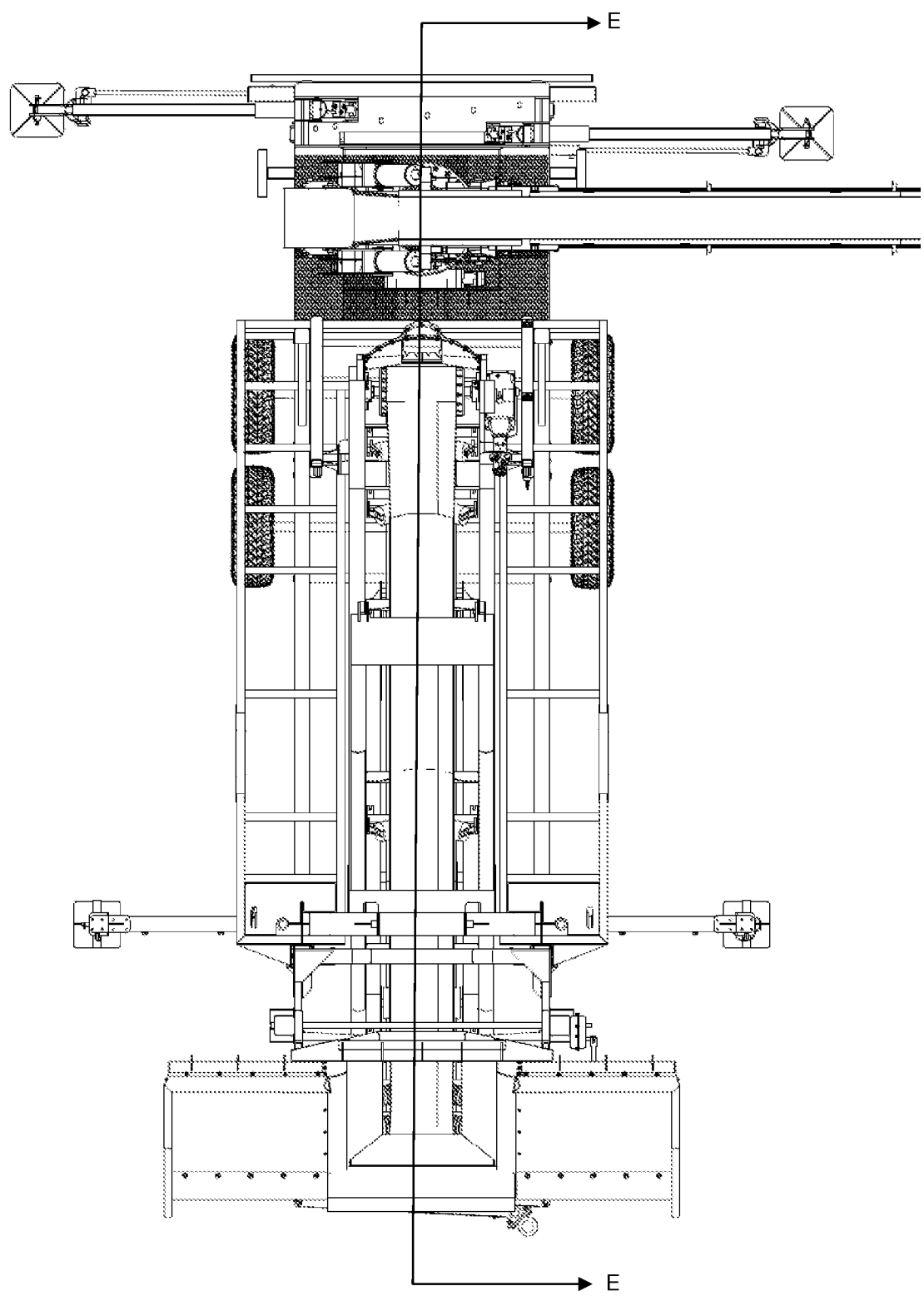
FIG. 35 is a plan view illustrating the embodiment of FIG. 23 as the feed conveyor transitions toward the transport mode.

FIG. 28 is a perspective view of the feed conveyor 130 in the operating position, and FIG. 29 shows an enlarged perspective view as the feed conveyor 130 begins to compact. As the arms 140, 150 are further rotated (FIG. 30), the distal end of the feed conveyor continues to move along a continuation of the arcuate path toward a compacted position (transport mode). As the feed conveyor 130 progresses from the operating position (FIGS. 25 and 28) to the compacted position, the extending segment 134 is moved longitudinally toward the pivoting segment 132 by the rotation of the arms 140, 150 by the rams 142, 152. As the arms 140, 150 are further rotated to the position shown in FIG. 31, this movement along an arcuate path continues until the feed conveyor 130 has been pivoted about the pivot axis P as far as desired, which is shown in FIG. 32, into the transport mode. After this, the hopper base 112H may be translated vertically, if desired, and then the primary conveyor 180 may be placed in the compacted position (transport mode or position), as shown in FIG. 23.

There is a system of take-up wheels 200, 202 around which the conveyor belt 131 is disposed so that, upon elongating the feed conveyor 130, the belt 131 accommodates this as additional belt length is released. This maintains tension in the top span of belt 131 on which material is conveyed. Upon shortening of the feed conveyor 130, the slack is taken up by the wheels 200, 202 so that the conveyor belt 131 is not too loose.

Thus, as the feed conveyor is placed into a position to receive material and convey the material onto the primary conveyor, its one end is positioned to receive material from the hopper 120, and its opposite, distal end is positioned to dispense the material onto the primary conveyor 180. The arms 140, 150 both raise and lower the extending segment 134 about the pivot, but also ensure the proper length of the entire feed conveyor 130. This not only keeps the feed conveyor 130 too short to prevent impact with the primary conveyor 180 during transition, but also keeps the feed conveyor 130 long enough to be extended above the primary conveyor 180 when pivoted to a high enough position.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A method of operating a compact portable conveyor, the method comprising:
   (a) transporting a base having first and second opposing base ends on a public roadway;
   (b) pivoting a primary conveyor, which is mounted near the first base end, about a substantially horizontal axis, and rotating the primary conveyor about a substantially vertical axis, wherein the primary conveyor has a first primary conveyor end disposed near the first base end; and
   (c) applying a force to an extending segment that is longitudinally-movably mounted to a pivoting segment, wherein the pivoting segment pivotably mounts to the base near the second base end and is disposed at least partially beneath a hopper, the applied force pivoting the pivoting segment relative to the base and simultaneously displacing the extending segment longitudinally relative to the pivoting segment.

2. The method in accordance with claim 1, wherein the step of applying a force further comprises rotating at least one arm that is pivotably mounted to the base and is pivotably mounted to the extending segment.

3. The method in accordance with claim 1, further comprising displacing vertically a hopper portion of the base relative to the first base end.

4. A compact portable conveyor apparatus, the apparatus comprising:
   (a) a base suitable for transport on public roadways and having first and second opposing base ends;
   (b) a primary conveyor pivotably, about a substantially horizontal axis, and rotatably, about a substantially vertical axis, mounted near the first base end, the primary conveyor having a first primary conveyor end disposed near the first base end;
   (c) a feed conveyor having:
      (i) a pivoting segment pivotably mounted to the base near the second base end and disposed at least partially beneath a hopper; and
      (ii) an extending segment longitudinally-movably mounted to the pivoting segment and extending toward the first primary conveyor end; and
   (d) at least one arm mounted to the base, the extending segment and a prime mover for, upon actuation of the prime mover, displacing the extending segment longitudinally relative to the pivoting segment and simultaneously pivoting the pivoting segment relative to the base.

5. The compact portable conveyor apparatus in accordance with claim 4, wherein the at least one arm is pivotably mounted to the base, the extending segment, and the prime mover.

6. The compact portable conveyor apparatus in accordance with claim 5, wherein a first end of the at least one arm is pivotably mounted to the extending segment, a second end of the at least one arm is pivotably mounted to the prime mover, and an intermediate section of the at least one arm is pivotably mounted to the base.

7. The compact portable conveyor apparatus in accordance with claim 4, wherein a portion of the base to which the hopper is mounted and to which the pivoting segment is pivotably mounted is vertically moveable relative to a remaining base portion.

8. A compact portable conveyor apparatus, the apparatus comprising:
   (a) a base suitable for transport on public roadways and having first and second opposing base ends;
   (b) a primary conveyor pivotably, about a substantially horizontal axis, and rotatably, about a substantially vertical axis, mounted near the first base end, the primary conveyor having a first primary conveyor end disposed near the first base end;
   (c) a feed conveyor having:
      (i) a pivoting segment pivotably mounted to the base near the second base end and disposed at least partially beneath a hopper; and
      (ii) an extending segment longitudinally-movably mounted to the pivoting segment and extending toward the first primary conveyor end; and
   (d) an elongated auxiliary conveyor pivotably mounted to the first primary conveyor end.

9. The compact portable conveyor apparatus in accordance with claim 8, wherein the auxiliary conveyor is selectively disposed in one of a transport position with a longitudinal axis substantially parallel to the primary conveyor and in which the auxiliary conveyor extends no farther than the primary conveyor ends, and an operational position, in which at least a portion of the auxiliary conveyor extends beyond at least the first primary conveyor end to receive material from the primary conveyor and convey the material away from the primary conveyor.

10. The compact portable conveyor apparatus in accordance with claim 8, wherein a longitudinal axis of the auxiliary conveyor is substantially parallel to the primary conveyor in the transport position.

11. The compact portable conveyor apparatus in accordance with claim 8, further comprising at least one arm mounted to the base, the extending segment and a prime mover for, upon actuation of the prime mover, displacing the extending segment longitudinally relative to the pivoting segment and simultaneously pivoting the pivoting segment relative to the base.

12. The compact portable conveyor apparatus in accordance with claim 11, wherein the at least one arm is pivotably mounted to the base, the extending segment, and the prime mover.

13. The compact portable conveyor apparatus in accordance with claim 12, wherein a first end of the at least one arm is pivotably mounted to the extending segment, a second end of the at least one arm is pivotably mounted to the prime mover, and an intermediate section of the at least one arm is pivotably mounted to the base.

14. The compact portable conveyor apparatus in accordance with claim 8, wherein a portion of the base to which the hopper is mounted and to which the pivoting segment is pivotably mounted is vertically moveable relative to a remaining base portion.

* * * * *